(12) United States Patent
Zheng et al.

(10) Patent No.: US 11,275,390 B2
(45) Date of Patent: Mar. 15, 2022

(54) CONTROL SYSTEM AND METHOD FOR DRONE WITH REMOTE CONTROLLER

(71) Applicant: Powervision Robot Inc., Beijing (CN)

(72) Inventors: Weifeng Zheng, Beijing (CN); Yangchun Wang, Beijing (CN); Yanqing Yang, Beijing (CN); Baoyi Zhang, Beijing (CN)

( * ) Notice: Subject to any disclaimer, the term of this patent is extended or adjusted under 35 U.S.C. 154(b) by 364 days.

(21) Appl. No.: 16/470,202

(22) PCT Filed: Dec. 15, 2017

(86) PCT No.: PCT/CN2017/116563
§ 371 (c)(1),
(2) Date: Jun. 14, 2019

(87) PCT Pub. No.: WO2018/108162
PCT Pub. Date: Jun. 21, 2018

(65) Prior Publication Data
US 2019/0310659 A1     Oct. 10, 2019

(30) Foreign Application Priority Data
Dec. 15, 2016   (CN) .......................... 201611161117.3
Dec. 15, 2016   (CN) .......................... 201611162161.6

(51) Int. Cl.
*G05D 1/08*     (2006.01)
*H04W 4/80*    (2018.01)
*B64C 39/02*    (2006.01)
*G05D 1/00*     (2006.01)
*G06F 21/32*    (2013.01)
(Continued)

(52) U.S. Cl.
CPC ........... *G05D 1/085* (2013.01); *B64C 39/024* (2013.01); *G05D 1/0011* (2013.01); *G05D 1/0094* (2013.01); *G05D 1/042* (2013.01); *G05D 1/0808* (2013.01); *G06F 21/32* (2013.01);
(Continued)

(58) Field of Classification Search
CPC ..................................................... G05D 1/085
See application file for complete search history.

(56) References Cited

U.S. PATENT DOCUMENTS 6,868,314 B1     3/2005  Frink
8,903,568 B1 *  12/2014  Wang ................... G05D 1/0038
                                                                            701/2
(Continued)

FOREIGN PATENT DOCUMENTS

CN         103123795 A     5/2013
CN         103426282 A    12/2013
(Continued)

*Primary Examiner* — Alex C Dunn
(74) *Attorney, Agent, or Firm* — Tianchen LLC; Yuan R. Li; Yi Fan Yin

(57) ABSTRACT

A control system is disclosed. The control system comprises a controlling terminal and a controlled device; the controlling terminal comprises a height measuring device and a processing unit; the height measuring device is configured to measure and obtain a height information of the controlling terminal, and send the height information to the processing unit; the processing unit is configured to receive the height information and generate an operation command; the controlled device is configured to receive the operation command and perform a corresponding motion according to the operation command.

16 Claims, 30 Drawing Sheets

(51) Int. Cl.
*H04W 4/02* (2018.01)
*G05D 1/04* (2006.01)

(52) U.S. Cl.
CPC ............ *H04W 4/027* (2013.01); *H04W 4/80* (2018.02); *B64C 2201/12* (2013.01)

(56) References Cited

U.S. PATENT DOCUMENTS

| | | | |
|---|---|---|---|
| 9,164,506 B1 | 10/2015 | Zang | |
| 9,321,531 B1* | 4/2016 | Takayama | B64C 39/024 |
| 9,696,725 B2* | 7/2017 | Wang | A63H 27/12 |
| 10,576,968 B2* | 3/2020 | Yamakoshi | B60W 50/00 |
| 10,707,572 B2* | 7/2020 | Ni | H01Q 1/28 |
| 10,747,225 B2* | 8/2020 | Wang | G05D 1/0016 |
| 10,810,679 B1* | 10/2020 | Farnsworth | H04L 9/0825 |
| 10,922,050 B2* | 2/2021 | Krispin | H04N 5/23206 |
| 2016/0117853 A1 | 4/2016 | Zhong et al. | |
| 2019/0004509 A1* | 1/2019 | Zheng | G05D 1/0033 |

FOREIGN PATENT DOCUMENTS

| | | |
|---|---|---|
| CN | 104035445 A | 9/2014 |
| CN | 104162278 A | 11/2014 |
| CN | 104665436 A | 6/2015 |
| CN | 104760695 A | 7/2015 |
| CN | 104898699 A | 9/2015 |
| CN | 105000170 A | 10/2015 |
| CN | 105223959 A | 1/2016 |
| CN | 204965717 U | 1/2016 |
| CN | 105306848 A | 2/2016 |
| CN | 105469579 A | 4/2016 |
| CN | 105554480 A | 5/2016 |
| CN | 105573338 A | 5/2016 |
| CN | 105678989 A | 6/2016 |
| CN | 105700543 A1 | 6/2016 |
| CN | 105700812 A | 6/2016 |
| CN | 105843245 A | 8/2016 |
| CN | 106155090 A | 11/2016 |
| JP | 2016058799 A | 4/2016 |

* cited by examiner

CONTROL SYSTEM AND METHOD FOR DRONE WITH REMOTE CONTROLLER

CROSS-REFERENCE TO RELATED APPLICATION

This application claims priority of International Patent Application Serial No. PCT/CN2017/116563, filed Dec. 15, 2017, which is related to and claims priority of Chinese patent applications Serial No. 201611162161.6 and 201611161117.3, filed Dec. 15, 2016. The entirety of each of the above-mentioned patent applications is hereby incorporated herein by reference and made a part of this specification.

TECHNICAL FIELD

The present application relates to a control system, and more particularly, to a control system capable of controlling a drone intelligently.

BACKGROUND

Drones, a kind of unmanned aerial vehicle (UAV), controlled by a remote controller and a program control device therein, are applied to many applications such as aerial photography, landscape measurement, transportation, etc. Since the drones have many advantages such as low cost, easy to use and high environmental adaptability, the drones become a popular commercial product recently.

In the prior art, the remote controller of the drone is not able to measure a height of the remote controller, and a flying height of the drone cannot be adjusted based on the height of the remote controller. Furthermore, given that the drone includes a gimbal and a camera disposed on the gimbal, a rotation angle of the gimbal is limited.

Therefore, it is necessary to improve the prior art.

SUMMARY

It is therefore a primary objective of the present invention to provide a control system, to improve over disadvantages of the prior art.

An embodiment of the present application discloses a control system. The control system comprises a controlling terminal and a controlled device; the controlling terminal comprises a height measuring device and a processing unit; the height measuring device is configured to measure and obtain a height information of the controlling terminal, and send the height information to the processing unit; the processing unit is configured to receive the height information and generate an operation command; the controlled device is configured to receive the operation command and perform a corresponding motion according to the operation command.

Preferably, the height measuring device is one or more of a barometer, a GPS device, an infrared altimeter, a laser altimeter, an image altimeter.

Preferably, the controlling terminal further comprises a height measuring switch; the height measuring switch is connected to the height measuring device and configured to control the height measuring device to be enabled and disabled; or the height measuring switch is connected to the processing unit and configured to control the processing unit to receive or refuse to receive information sent from the height measuring device.

Preferably, the controlling terminal comprises a communication unit; the communication unit is connected to the processing unit and configured to perform data transmission with the controlled device; and the communication unit comprises one or any combination of a WiFi module, a Bluetooth module or an infrared ray emission module.

Preferably, the corresponding motion comprises varying a height of the controlled device; the controlled device receiving the operation command and performing the corresponding motion according to the operation command comprises that the controlled device adjusts the height of the controlled device according to the height information of the controlling terminal measured by the height measuring device.

Preferably, the controlling terminal is a remote controller, and the controlled device is a drone.

Preferably, the remote controller is a somatosensory remote controller; when the height measuring device determines that the somatosensory remote controller is rising, the operation command comprises a rising information, and the drone increases a flight altitude of the drone according to the operation command after the drone receives the operation command; when the height measuring device determines that the somatosensory remote controller is declining, the operation command comprises a declining information, the drone decreases the flight altitude of the drone according to the operation command after the drone receives the operation command.

Preferably, the somatosensory remote controller comprises a attitude sensor configured to detect and generate an attitude information; and the processing unit is configured to generate the operation command according to the attitude information and send the operation command to the drone.

Preferably, the somatosensory remote controller further comprises a rocker and a power supply; the rocker is connected to the processing unit, the rocker is configured to generate a rocker information, and the processing unit processes the rocker information to form the operation command and sends the operation command to the drone.

Preferably, the somatosensory remote controller further comprises a power switch and a remote control activation switch; the power switch is configured to cutoff the power supply or to open the power supply; the remote control activation switch is connected to the processing unit; when the remote control activation switch is on, the somatosensory remote controller regards a current location of the drone as an initial location to control the drone; and when the remote control activation switch is off, the somatosensory remote controller ceases operation.

Preferably, the remote controller is a primary remote controller, wherein the primary remote controller does not have motion-sensing functionality; the height measuring device determines that the primary remote controller is rising, the operation command comprises a rising information, and the drone increases a flight altitude of the drone according to the operation command after the drone receives the operation command; the height measuring device determines that the primary remote controller is declining, the operation command comprises a declining information, the drone decreases the flight altitude of the drone according to the operation command after the drone receives the operation command.

Preferably, the primary remote controller further comprises a rocker and a power supply; the rocker is configured to generate a rocker information and send the rocker information to the processing unit; the processing unit is configured to form the operation command according to the rocker information generated by the rocker and send the operation command to the drone; and the power supply is configured to supply power to the primary remote controller.

Preferably, the primary remote controller comprises two rockers.

An embodiment of the present application further discloses a somatosensory remote controller. The somatosensory remote controller comprises a height measuring device, a attitude sensor, a processing unit and a communication unit; the height measuring device, the attitude sensor, the processing unit and the communication unit are disposed within the somatosensory remote controller; the height measuring device, the attitude sensor and the communication unit are electrically connected to the processing unit; the height measuring device is configured to obtain a height information of a main body of the somatosensory remote controller and send the height information to the processing unit; the attitude sensor is configured to obtain a posed information of the main body of the somatosensory remote controller and send the posed information to the processing unit; the processing unit is configured to process the height information and the attitude information, generate an operation command, and send the operation command via the communication unit.

Preferably, the somatosensory remote controller further comprises an up button, a down button, a timer; the up button, the down button, the timer are connected to the processing unit; the up button is configured to receive a first pressing signal, and send the first pressing signal to the processing unit; the down button is configured to receive a second pressing signal, and send the second pressing signal to the processing unit; the timer is configured to record a first pressing time of the up button and a second pressing time of the down button, and send a pressing time information to the processing unit; and the processing unit is configured to generate the operation command according to the pressing time information, and send the operation command to a controlled device via the communication unit.

Preferably, the somatosensory remote controller further comprises a height measuring switch; the height measuring switch is connected to the height measuring device and configured to control the height measuring device to be enabled and disabled; or the height measuring switch is connected to the processing unit and configured to control the processing unit to receive or refuse to receive information sent from the height measuring device.

Preferably, the height measuring device is one or more of a barometer, a GPS device, an infrared altimeter, a laser altimeter, an image altimeter.

Preferably, the somatosensory remote controller further comprises: a rocker device and a vibration motor; the rocker device and the vibration motor are connected to the processing unit; the rocker device is configured to receive a manipulation from a user, form a rocker information, and send the rocker information to the processing unit; and the vibration motor is configured to vibrate according to the operation command from the processing unit to remind the user.

Preferably, the somatosensory remote controller further comprises a remote control activation switch; the remote control activation switch is connected to the processing unit; when the remote control activation switch is on, the somatosensory remote controller regards a current location of the drone as an initial location to control the drone; and when the remote control activation switch is off, the somatosensory remote controller ceases operation.

Preferably, the somatosensory remote controller further comprises a sensing device; the sensing device comprises one or any combination of a pressure sensor, a fingerprint sensor or a temperature sensor; the pressure sensor is configured to obtain a pressure information perceived by the somatosensory remote controller, and send the pressure information to the processing unit so as to form the operation command; the fingerprint sensor is configured to obtain a fingerprint information of the user, and send the fingerprint information to the processing unit so as to form the operation command; and the temperature sensor is configured to obtain a temperature information of an environment in which the somatosensory remote controller stays, and send the temperature information to the processing unit so as to form the operation command.

An embodiment of the present application further discloses a control method. The control method comprises generating an operation command via a controlling terminal; sending the operation command via a communication unit to a controlled device; the controlled device controlling a loading platform of the controlled device to perform a corresponding motion according to the operation command after the controlled device receives the operation command; the controlled device controlling the controlled device to perform the corresponding motion when the loading platform performs the corresponding motion to achieve a preset threshold.

Preferably, the step of generating the operation command via the controlling terminal comprises generating an operation information by a control part of the controlling terminal, wherein the control part is manipulated by a user; and generating the operation command by a processing unit of the controlling terminal.

Preferably, the communication unit is disposed within the controlling terminal, and the communication unit comprises one or any combination of a WiFi module, a Bluetooth module or an infrared ray emission module.

Preferably, the controlling terminal is a remote controller; the control part is a rocker; the controlled device is a drone; the loading platform is a gimbal; the corresponding motion is a gimbal pitch operation, a gimbal yaw operation or a gimbal roll operation.

Preferably, the operation command comprises the operation information brought by the rocker; the drone generates a command for controlling the gimbal of the drone to perform the corresponding motion according to the operation command; or the operation command comprises the command for controlling the gimbal of the drone to perform the corresponding motion according to the operation command.

Preferably, when the operation command comprises the command for the gimbal to perform the gimbal pitch operation or after the drone or the gimbal receives the operation command, controlling the gimbal to perform a pitch operation according to a back-and-forth manipulation or a left-and-right manipulation performed by the user onto the rocker.

Preferably, the preset threshold is a preset angle of the gimbal pitch operation; after the gimbal performs the pitch operation and achieves the preset angle, the drone controls a body of the drone to perform a pitch motion in a direction which is the same as the gimbal pitch operation, such that an actual pitch angle which the gimbal experiences is greater than the preset angle.

Preferably, when the operation command comprises the command for the gimbal to perform the gimbal yaw operation or after the drone or the gimbal receives the operation command, controlling the gimbal to perform a yaw operation according to a back-and-forth manipulation or a left-and-right manipulation performed by the user onto the rocker.

Preferably, the preset threshold is a preset angle of the gimbal yaw operation; after the gimbal performs the yaw operation and achieves the preset angle, the drone controls a body of the drone to perform a yaw motion in a direction which is the same as the gimbal yaw operation, such that the gimbal is able to perform yaw operation in 360° without limitation.

Preferably, when the operation command comprises the command for the gimbal to perform the gimbal roll operation or after the drone or the gimbal receives the operation command, controlling the gimbal to perform a roll operation according to a back-and-forth manipulation or a left-and-right manipulation performed by the user onto the rocker.

Preferably, the preset threshold is a preset angle of the gimbal roll operation; after the gimbal performs the roll operation and achieves the preset angle, the drone controls a body of the drone to perform a roll motion in a direction which is the same as the gimbal pitch operation, such that an actual roll angle which the gimbal experiences is greater than the preset angle.

Preferably, the remote controller further comprises a attitude sensor, and the control part is the attitude sensor; the attitude sensor is configured to obtain a posed information of a main body of the remote controller, and send the posed information to the processing unit of the remote controller so as to form the operation command to control the gimbal.

Preferably, the controlling terminal is the remote controller; the control part is the height measuring device; the controlled device is a drone; the corresponding motion is a rising operation or a declining of the loading platform.

Preferably, the height measuring device is one or more of a barometer, a GPS device, an infrared altimeter, a laser altimeter, an image altimeter.

Preferably, the operation command comprises the operation information brought by the height measuring device; the drone generates a command for controlling the loading platform of the drone to perform the corresponding motion according to the operation command; or the operation command comprises the command for controlling the loading platform of the drone to perform the corresponding motion according to the operation command.

Preferably, when the operation command comprises the command for the loading platform to perform the rising operation or after the drone or the loading platform receives the operation command, controlling the loading platform to perform the rising operation according to a rising value of the remote controller measured by the height measuring device.

Preferably, the preset threshold is a preset height of the loading platform performing the rising operation; after the loading platform performs the rising operation and achieves the preset height, the drone rises, such that a rising height of the loading platform is greater than the preset height.

Preferably, when the operation command comprises the command for the loading platform to perform the declining operation or after the drone or the loading platform receives the operation command, controlling the loading platform to perform the declining operation according to a declining value of the remote controller measured by the height measuring device.

Preferably, the preset threshold is a preset height of the loading platform performing the declining operation; after the loading platform performs the declining operation and achieves the preset height, the drone rises, such that a declining height of the loading platform is greater than the preset height.

An embodiment of the present application further discloses a drone control method. The method comprises generating an operation command via a remote controller under a user-perspective mode; sending the operation command via a communication unit to a drone; the drone controlling a gimbal of the drone to perform a corresponding motion according to the operation command after the drone receives the operation command; the drone controlling the drone to perform the corresponding motion when the gimbal performs the corresponding motion to achieve a preset threshold.

Preferably, after the remote controller and the drone are successfully connected, the drone automatically switches a flight mode to the user-perspective mode; or the flight mode of the drone is switched to the user-perspective mode via a mode switching part of the remote controller.

Preferably, the step of generating the operation command via the remote controller under the user-perspective mode comprises generating an operation information a control part of the remote controller, wherein the control part is manipulated by a user; and generating the operation command by a processing unit of the drone.

Preferably, the communication unit is disposed within the remote controller, and the communication unit comprises one or any combination of a WiFi module, a Bluetooth module or an infrared ray emission module.

Preferably, the control part is a rocker; the corresponding motion is a gimbal pitch operation, a gimbal yaw operation or a gimbal roll operation.

Preferably, the operation command comprises the operation information brought by the rocker; the drone generates a command for controlling the gimbal of the drone to perform the corresponding motion according to the operation command; or the operation command comprises the command for controlling the gimbal of the drone to perform the corresponding motion according to the operation command.

Preferably, when the operation command comprises the command for the gimbal to perform the gimbal pitch operation or after the drone or the gimbal receives the operation command, controlling the gimbal to perform a pith operation according to a back-and-forth manipulation or a left-and-right manipulation performed by the user onto the rocker.

Preferably, the preset threshold is a preset angle of the gimbal pitch operation; after the gimbal performs the pitch operation and achieves the preset angle, the drone controls a body of the drone to perform a pitch motion in a direction which is the same as the gimbal pitch operation, such that an actual pitch angle which the gimbal experiences is greater than the preset angle.

Preferably, when the operation command comprises the command for the gimbal to perform the gimbal yaw operation or after the drone or the gimbal receives the operation command, controlling the gimbal to perform a yaw operation according to a back-and-forth manipulation or a left-and-right manipulation performed by the user onto the rocker.

Preferably, the preset threshold is a preset angle of the gimbal yaw operation; after the gimbal performs the yaw operation and achieves the preset angle, the drone controls a body of the drone to perform a yaw motion in a direction which is the same as the gimbal yaw operation, such that the gimbal is able to perform yaw operation in 360° without limitation.

Preferably, when the operation command comprises the command for the gimbal to perform the gimbal roll operation or after the drone or the gimbal receives the operation command, controlling the gimbal to perform a roll operation according to a back-and-forth manipulation or a left-and-right manipulation performed by the user onto the rocker.

Preferably, the preset threshold is a preset angle of the gimbal roll operation; after the gimbal performs the roll operation and achieves the preset angle, the drone controls a body of the drone to perform a roll motion in a direction which is the same as the gimbal pitch operation, such that an actual roll angle which the gimbal experiences is greater than the preset angle.

BRIEF DESCRIPTION OF THE DRAWINGS

These and other objectives of the present invention will no doubt become obvious to those of ordinary skill in the art after reading the following detailed description of the preferred embodiment that is illustrated in the various figures and drawings.

DETAILED DESCRIPTION

In order to make the objects, technical solutions and advantages of the present application become more apparent, the following relies on the accompanying drawings and embodiments to describe the present application in further detail. It should be understood that the specific embodiments described herein are only for explaining the present application and are not intended to limit the present application.

Figure 1:
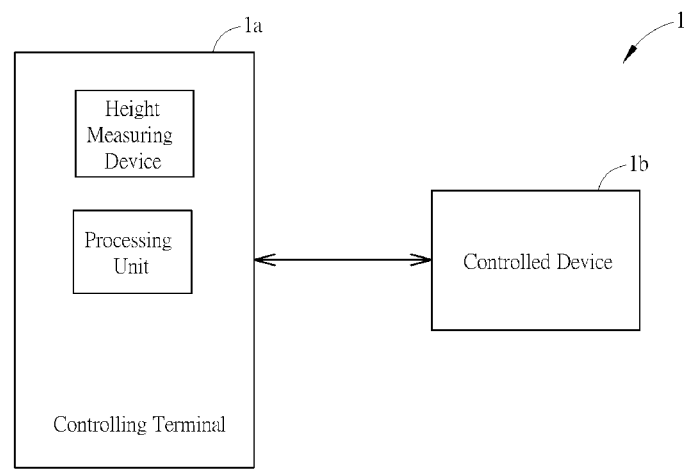
FIG. 1 is a functional block diagram of a control system according to an embodiment of the present application.

FIG. 1 is a functional block diagram of a control system 1 according to an embodiment of the present application. The control system 1 comprises a controlling terminal 1a and a controlled device 1b. The controlling terminal 1a comprises a height measuring device and a processing unit. The height measuring device is configured to measure and obtain a height information of the controlling terminal 1a, and send the height information to the processing unit. The processing unit is configured to receive the height information and generate an operation command. The controlled device 1b is configured to receive the operation command and perform a corresponding motion/operation according to the operation command.

Realization of the height measuring device is not limited. For example, the height measuring device may be one or more of a barometer, a GPS device, an infrared altimeter, a laser altimeter, an image altimeter.

The controlling terminal may comprise a height measuring switch. In an embodiment, the height measuring switch may be connected to the height measuring device and configured to control the height measuring device to be enabled and disabled. In another embodiment, the height measuring switch may be connected to the processing unit and configured to control the processing unit to receive or refuse to receive information sent from the height measuring device. Therefore, when the user do not requires the height information, the user may configure the height measuring switch 112 in the OFF status, such that the power consumption of the controlling terminal is reduced.

Figure 2:
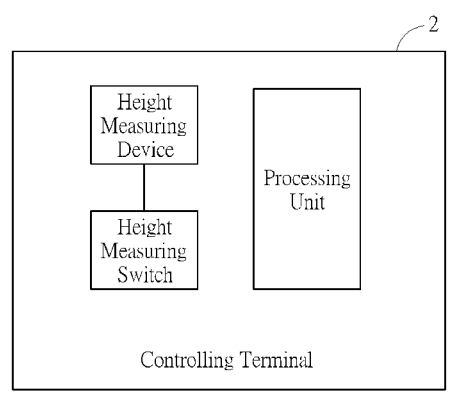
FIG. 2 is a functional block diagram of a controlling terminal according to an embodiment of the present application.
Figure 3:
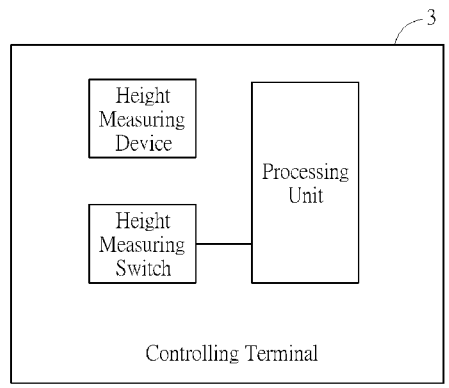
FIG. 3 is a functional block diagram of a controlling terminal according to an embodiment of the present application.

FIG. 2 is a functional block diagram of a controlling terminal 2 according to an embodiment of the present application. FIG. 3 is a functional block diagram of a controlling terminal 3 according to an embodiment of the present application. In FIG. 2, the height measuring switch of the controlling terminal 2 is connected to the height measuring device and configured to control the height measuring device to be enabled and disabled. On the other hand, in FIG. 2, the height measuring switch of the controlling terminal 3 is connected to the processing unit and configured to control the processing unit to receive or refuse to receive information sent from the height measuring device.

Figure 4:
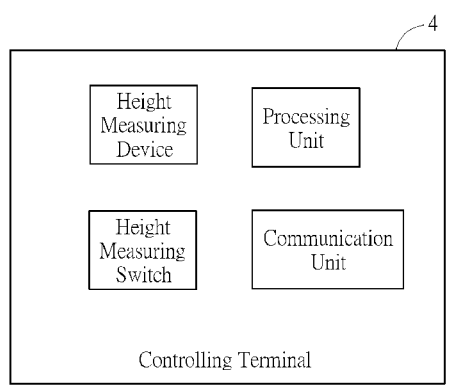
FIG. 4 is a functional block diagram of a controlling terminal according to an embodiment of the present application.

FIG. 4 is a functional block diagram of a controlling terminal 4 according to an embodiment of the present application. The controlling terminal 4 is similar to the controlling terminal 2 or the controlling terminal 3. Different from the controlling terminal 2 or the controlling terminal 3, the controlling terminal 4 comprises a communication unit. The communication unit may comprise one or any combination of a WiFi module, a Bluetooth module or an infrared ray emission module. The the communication unit is connected to the processing unit of the controlling terminal 4 and configured to perform data transmission with the controlled device 1b.

In another perspective, the corresponding motion/operation performed by the controlled device 1b may be a motion/operation of varying a height of the controlled device 1b. Specifically, the height of the controlled device 1b may be adjusted according to the height of the controlling terminal 4. That is, the controlled device may be controlled to adjust the height of the controlled device according to the height information of the controlling terminal measured by the height measuring device.

In an embodiment, in the control system of the present application, the controlling terminal may be a remote controller, and the controlled device is a drone. Furthermore, the remote controller may be a somatosensory remote controller.

Figure 5:
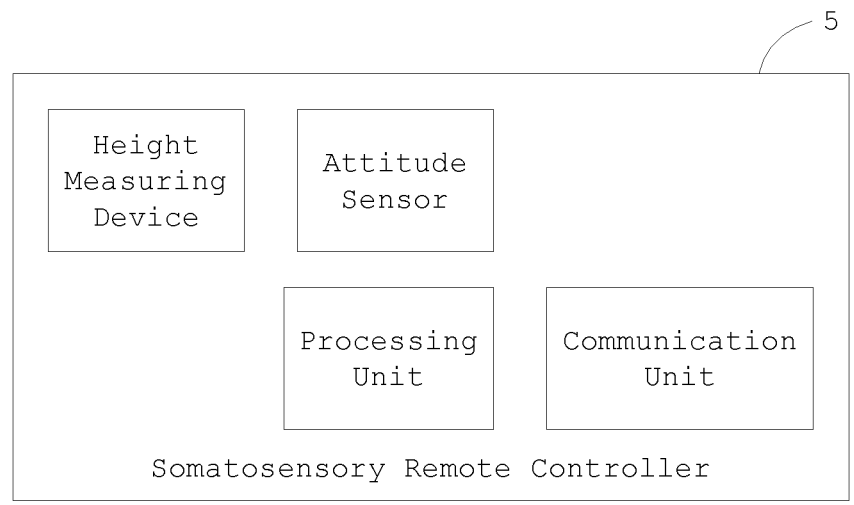
FIG. 5 is a functional block diagram of a somatosensory remote controller according to an embodiment of the present application.

FIG. 5 is a functional block diagram of a somatosensory remote controller 5 according to an embodiment of the present application. The somatosensory remote controller 5 is similar to the controlling terminal 4. Different from the controlling terminal 4, the somatosensory remote controller 5 comprises a attitude sensor. The attitude sensor is configured to detect and generate a attitude information. The attitude information would be send to the processing unit. The processing unit then generates the operation command according to the attitude information after the processing unit receives the attitude information. The communication unit would send the operation command to the drone after the processing unit generates the operation command.

Specifically, when the height measuring device detects/determines that the somatosensory remote controller 5 is rising, meaning that the height of the somatosensory remote controller 5 is increasing, the operation command may comprise a rising information, and the drone may increase a flight altitude of the drone according to the operation command after the drone receives the operation command. On the other hand, when the height measuring device detects/determines that the somatosensory remote controller 5 is declining, meaning that the height of the somatosensory remote controller 5 is decreasing, the operation command comprises a declining information, the drone decreases the flight altitude of the drone according to the operation command after the drone receives the operation command.

Figure 6:
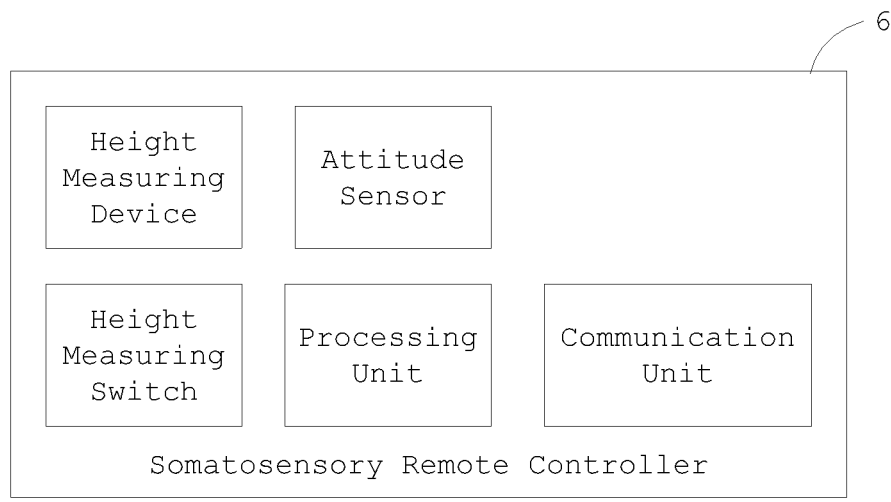
FIG. 6 is a functional block diagram of a somatosensory remote controller according to an embodiment of the present application.

FIG. 6 is a functional block diagram of a somatosensory remote controller 6 according to an embodiment of the present application. The somatosensory remote controller 6 is similar to the somatosensory remote controller 5. Different from the somatosensory remote controller 5, the somatosensory remote controller 6 further comprises a height measuring switch. The functionality of the height measuring switch may be referred to paragraph stated in the above, which is not narrated herein for brevity.

Figure 7:
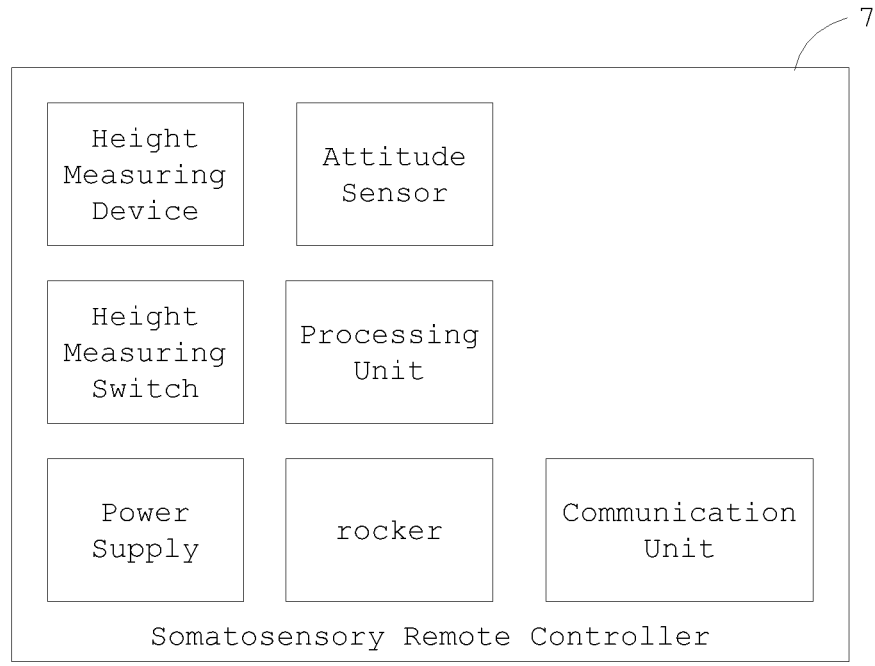
FIG. 7 is a functional block diagram of a somatosensory remote controller according to an embodiment of the present application.

FIG. 7 is a functional block diagram of a somatosensory remote controller 7 according to an embodiment of the present application. The somatosensory remote controller 7 is similar to the somatosensory remote controller 6. Different from the somatosensory remote controller 6, the somatosensory remote controller 7 further comprises a rocker and a power supply. The rocker may be connected to the processing unit, the rocker is configured to generate a rocker information, and send the rocker information to the processing unit. The processing unit processes the rocker information to form/generate the operation command and sends the operation command to the drone via the communication unit. The power supply is configured to supply power to the somatosensory remote controller 7. In an embodiment, the remote controller of the present application may comprise two rockers to perform different operations/motion of the controlled device or the drone.

Figure 8:
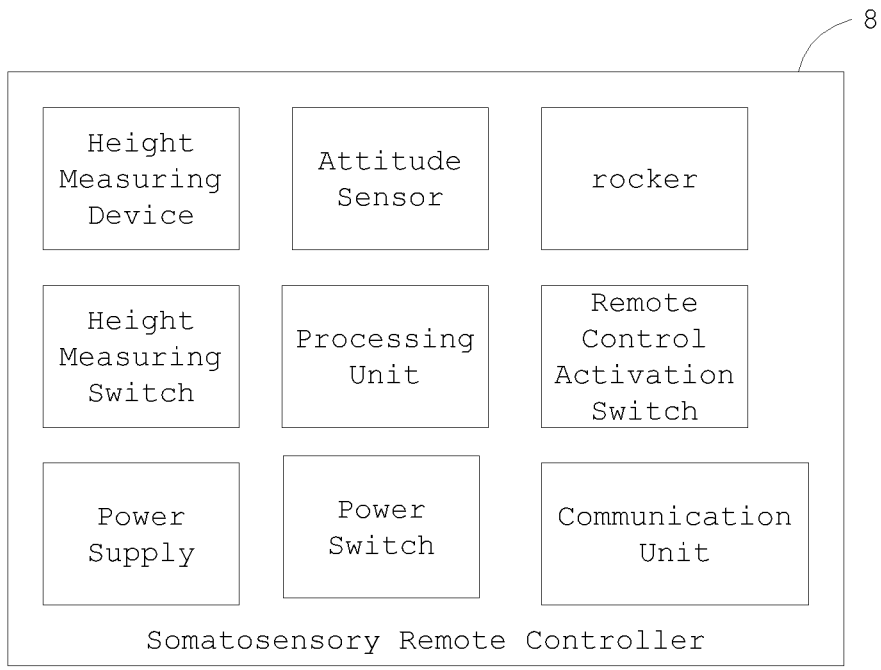
FIG. 8 is a functional block diagram of a somatosensory remote controller according to an embodiment of the present application.

FIG. 8 is a functional block diagram of a somatosensory remote controller 8 according to an embodiment of the present application. The somatosensory remote controller 8 is similar to the somatosensory remote controller 7. Different from the somatosensory remote controller 7, the somatosensory remote controller 8 further comprises a power switch and a remote control activation switch. The power switch is configured to cutoff the power supply for the somatosensory remote controller 8 or to open the power supply, i.e., supply power for the somatosensory remote controller 8. The remote control activation switch is connected to the processing unit. When the remote control activation switch is on (or an on status), the somatosensory remote controller 8 regards a current location of the drone as an initial location to control the drone. That is, the somatosensory remote controller 8 regards a current location of the drone as an initial location to perform further motions/operations. When the remote control activation switch is off (or an on status), the somatosensory remote controller 8 ceases performing any operation.

In another perspective, the remote controller is a primary remote controller. The primary remote controller means that the remote controller does not have motion-sensing functionality, implying that the remote controller comprise no attitude sensor.

Figure 9:
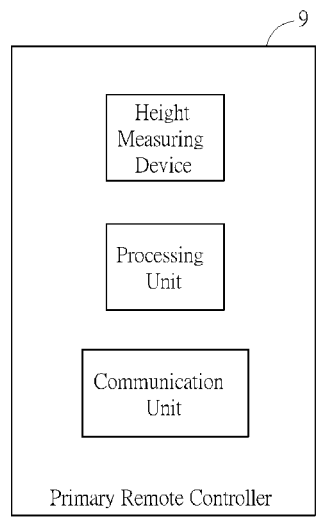
FIG. 9 is a functional block diagram of a primary remote controller according to an embodiment of the present application.

FIG. 9 is a functional block diagram of a primary remote controller 9 according to an embodiment of the present application. As shown in FIG. 9, the primary remote controller 9 comprises no attitude sensor.

Figure 10:
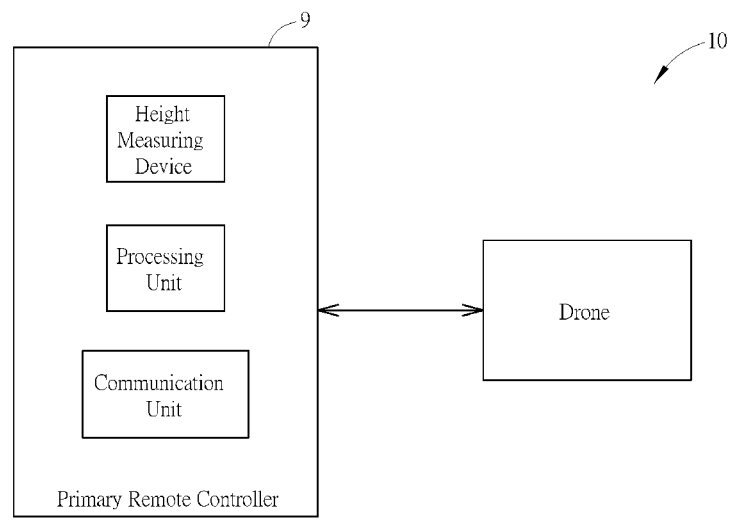
FIG. 10 is a functional block diagram of a control system according to an embodiment of the present application.

The primary remote controller 9 may be applied in a control system. FIG. 10 is a functional block diagram of a control system 10 according to an embodiment of the present application. The control system 10 comprises the primary remote controller 9 and a drone. When the height measuring device of the primary remote controller 9 determines that the primary remote controller 9 is rising, the operation command generated by the primary remote controller 9 may comprise a rising information. After the drone receives the operation command, the drone would increase a flight altitude of the drone according to the operation command. Similarly, the height measuring device of the primary remote controller 9 determines that the primary remote controller 9 is declining, the operation command generated by the primary remote controller 9 may comprise a declining information, and the drone may decrease the flight altitude of the drone according to the operation command after the drone receives the operation command.

Figure 11:
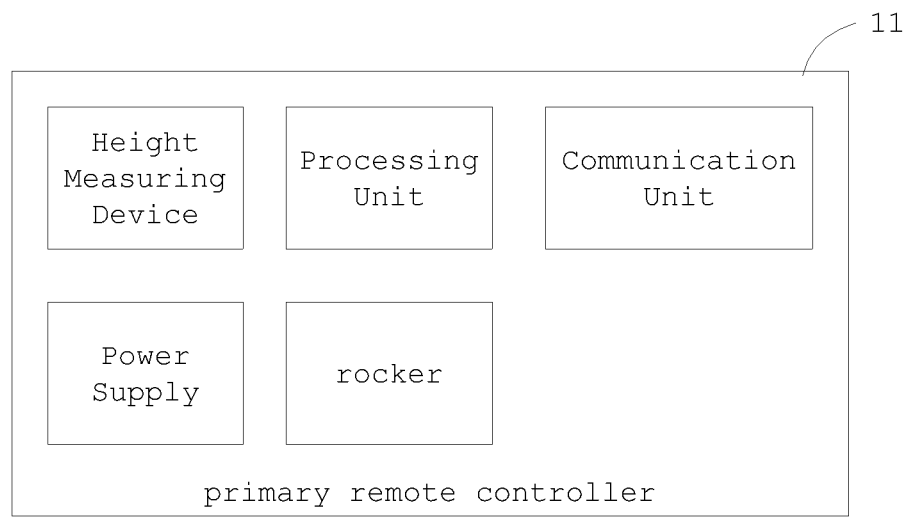
FIG. 11 is a functional block diagram of a primary remote controller according to an embodiment of the present application.

FIG. 11 is a functional block diagram of a primary remote controller 11 according to an embodiment of the present application. The primary remote controller 11 is similar to the primary remote controller 9. Different from the primary remote controller 9, the primary remote controller 11 further comprises a rocker and a power supply. Similarly, the rocker is configured to generate a rocker information and send the rocker information to the processing unit of the primary remote controller 11. The processing unit of the primary remote controller 11 is configured to form/generate the operation command according to the rocker information generated by the rocker and send the operation command to the drone via the communication unit. The power supply is configured to supply power to the primary remote controller 11.

Figure 12:
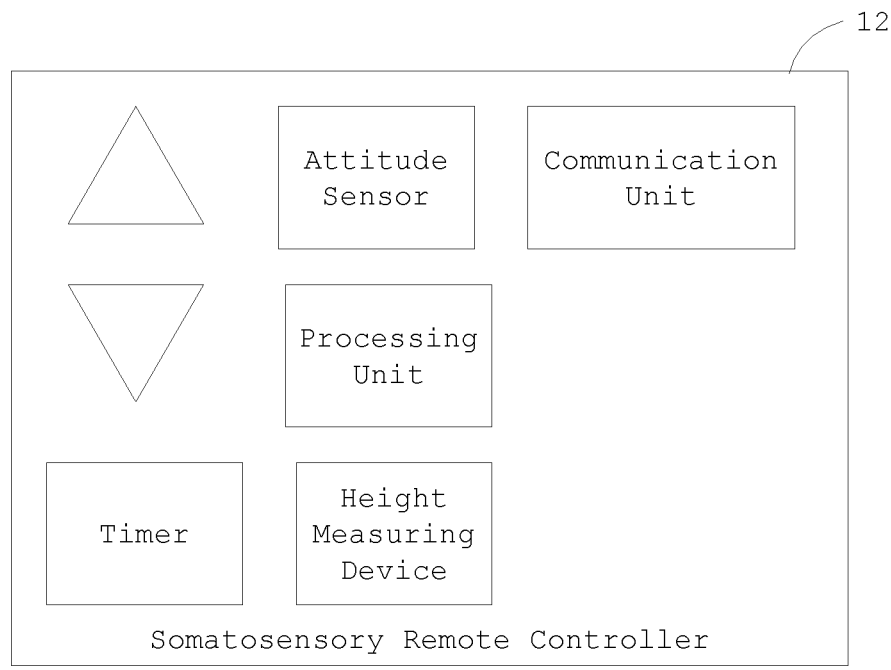
FIG. 12 is a functional block diagram of a somatosensory remote controller according to an embodiment of the present application.

FIG. 12 is a functional block diagram of a somatosensory remote controller 12 according to an embodiment of the present application. The somatosensory remote controller 12 is similar to the somatosensory remote controller 8. Different from the somatosensory remote controller 8, the somatosensory remote controller 12 further comprises an up button, a down button and a timer. The up button, the down button and the timer are connected to the processing unit of the somatosensory remote controller 12. The up button is configured to receive a first pressing signal, and send the first pressing signal to the processing unit. The the down button is configured to receive a second pressing signal, and send the second pressing signal to the processing unit. The timer is configured to record a first pressing time of the up button and a second pressing time of the down button, and send a pressing time information to the processing unit, wherein the pressing time information may comprises the first pressing time of the up button and the second pressing time of the down button. The processing unit generates the operation command according to the pressing time information, and sends the operation command to the controlled device via the communication unit.

Figure 13:
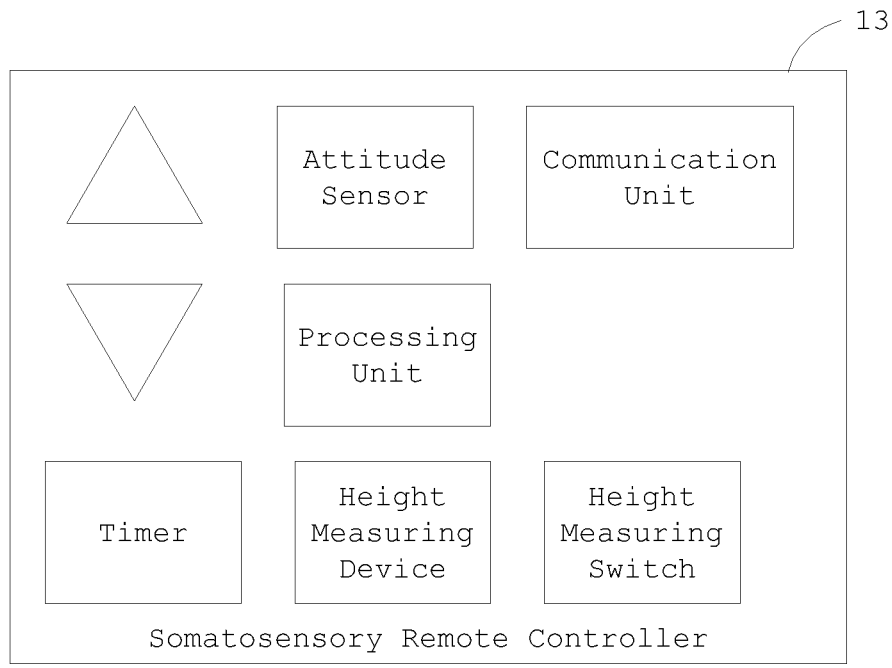
FIG. 13 is a functional block diagram of a somatosensory remote controller according to an embodiment of the present application.

FIG. 13 is a functional block diagram of a somatosensory remote controller 13 according to an embodiment of the present application. The somatosensory remote controller 13 is similar to the somatosensory remote controller 12. Different from the somatosensory remote controller 12, the somatosensory remote controller 13 further comprises a height measuring switch. The functionality of the height measuring switch may be referred to paragraph stated in the above, which is not narrated herein for brevity.

Figure 14:
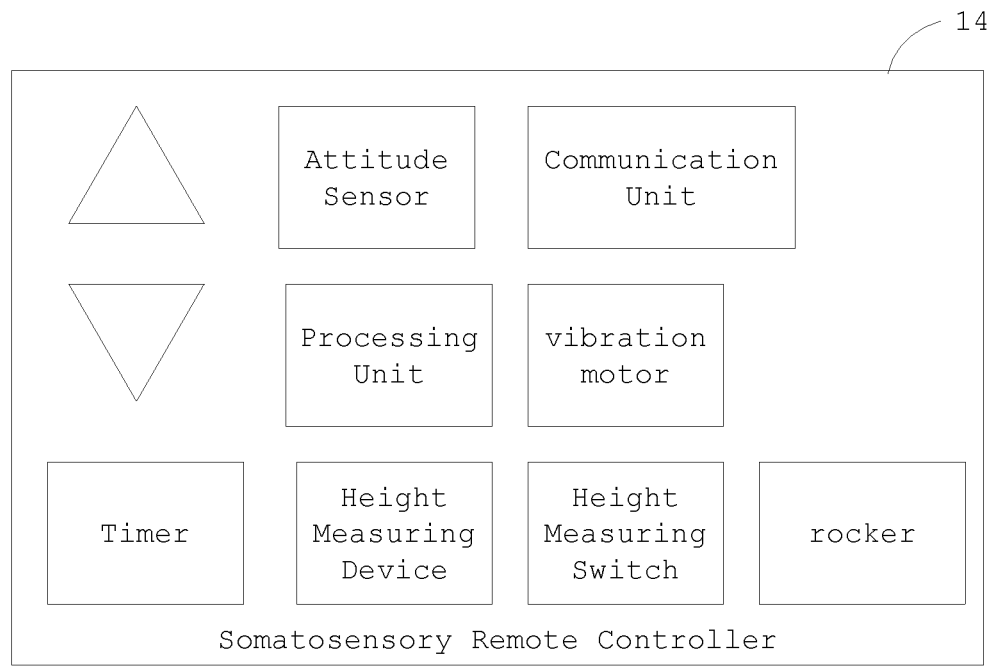
FIG. 14 is a functional block diagram of a somatosensory remote controller according to an embodiment of the present application.

FIG. 14 is a functional block diagram of a somatosensory remote controller 14 according to an embodiment of the present application. The somatosensory remote controller 14 is similar to the somatosensory remote controller 13. Different from the somatosensory remote controller 13, the somatosensory remote controller 14 further comprises a rocker device and a vibration motor. The rocker device and the vibration motor are connected to the processing unit. The rocker device is configured to receive a manipulation from a user and generate/form a rocker information. The rocker device sends the rocker information to the processing unit of the somatosensory remote controller 14. The vibration motor is configured to vibrate according to the operation command from the processing unit to remind the user.

Figure 15:
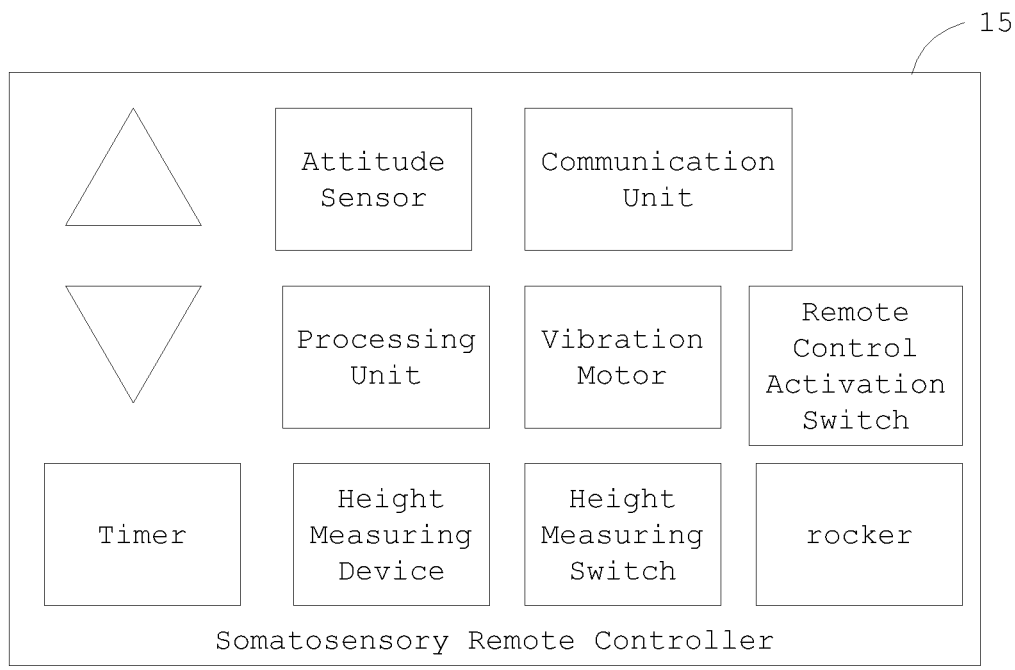
FIG. 15 is a functional block diagram of a somatosensory remote controller according to an embodiment of the present application.

FIG. 15 is a functional block diagram of a somatosensory remote controller 15 according to an embodiment of the present application. The somatosensory remote controller 15 is similar to the somatosensory remote controller 14. Different from the somatosensory remote controller 14, the somatosensory remote controller 15 further comprises a remote control activation switch. Similarly, the remote control activation switch is connected to the processing unit. When the remote control activation switch is on, the somatosensory remote controller 14 regards a current location of the drone as an initial location to control the drone. That is, the somatosensory remote controller 8 regards a current location of the drone as an initial location to perform further motions/operations. When the remote control activation switch is off, the somatosensory remote controller 14 ceases performing any operation.

Figure 16:
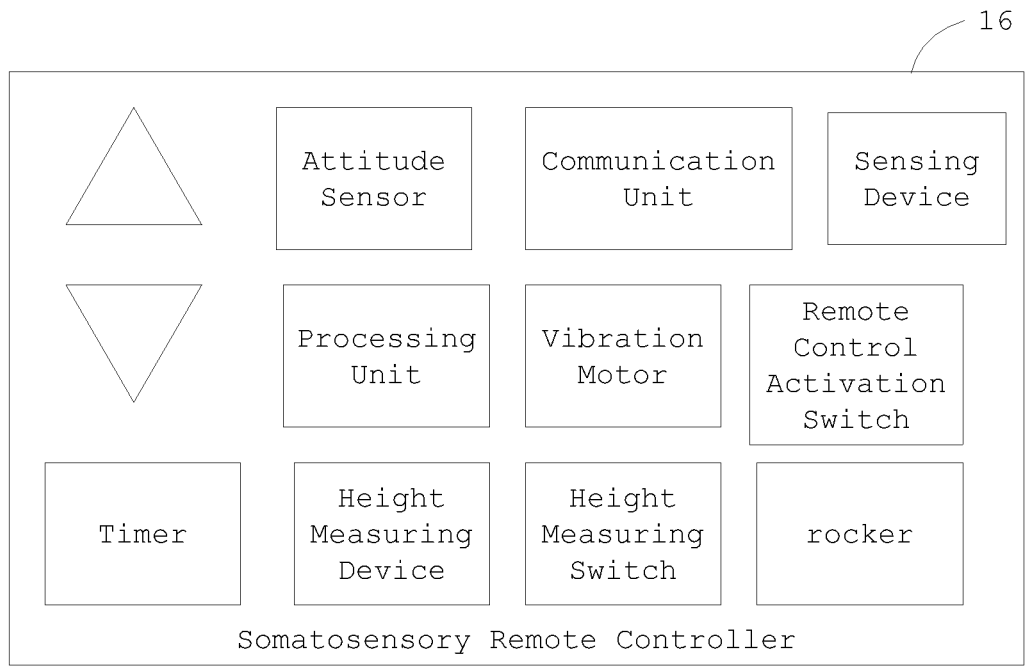
FIG. 16 is a functional block diagram of a somatosensory remote controller according to an embodiment of the present application.
Figure 17:
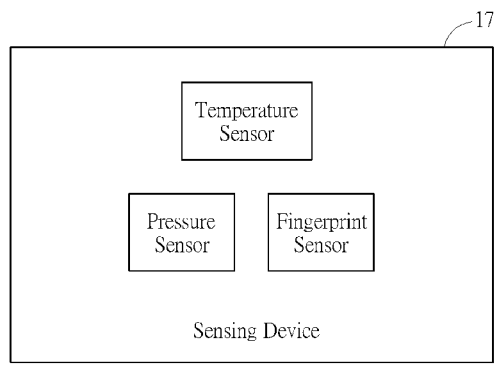
FIG. 17 is a functional block diagram of a sensing device according to an embodiment of the present application.

FIG. 16 is a functional block diagram of a somatosensory remote controller 16 according to an embodiment of the present application. The somatosensory remote controller 16 is similar to the somatosensory remote controller 15. Different from the somatosensory remote controller 15, the somatosensory remote controller 16 further comprises a sensing device. The sensing device may comprise one or any combination of a pressure sensor, a fingerprint sensor or a temperature sensor. For example, FIG. 17 is a functional block diagram of a sensing device 17 according to an embodiment of the present application. The sensing device 17 may be disposed in the somatosensory remote controller 16. The pressure sensor is configured to obtain a pressure information perceived by the somatosensory remote controller 16, and send the pressure information to the processing unit of the somatosensory remote controller 16 so as to form the operation command. The fingerprint sensor is configured to obtain a fingerprint information of the user, and send the fingerprint information to the processing unit of the somatosensory remote controller 16 so as to form the operation command. The temperature sensor is configured to obtain a temperature information of an environment in which the somatosensory remote controller 16 stays, and send the temperature information to the processing unit of the somatosensory remote controller 16 so as to form the operation command.

Figure 18:
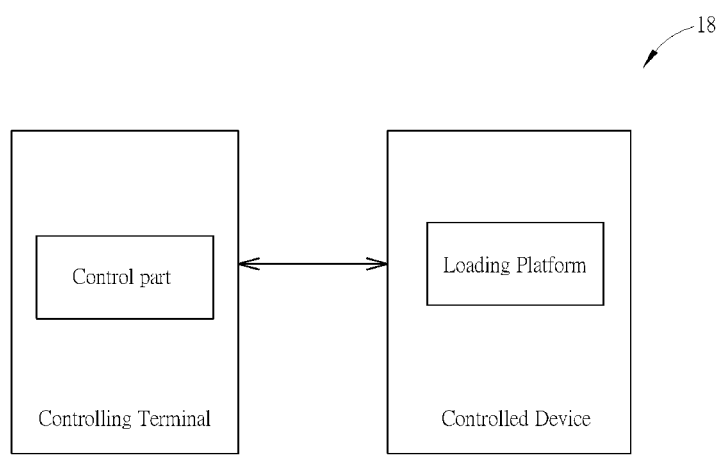
FIG. 18 is a functional block diagram of a control system according to an embodiment of the present application.

FIG. 18 is a functional block diagram of a control system 18 according to an embodiment of the present application. The control system 18 comprises a controlling terminal and a controlled device. The controlling terminal of the control system 18 comprises a control part. The controlled device of the control system 18 comprises a loading platform, and a specific device may be disposed on the loading platform.

Figure 20:
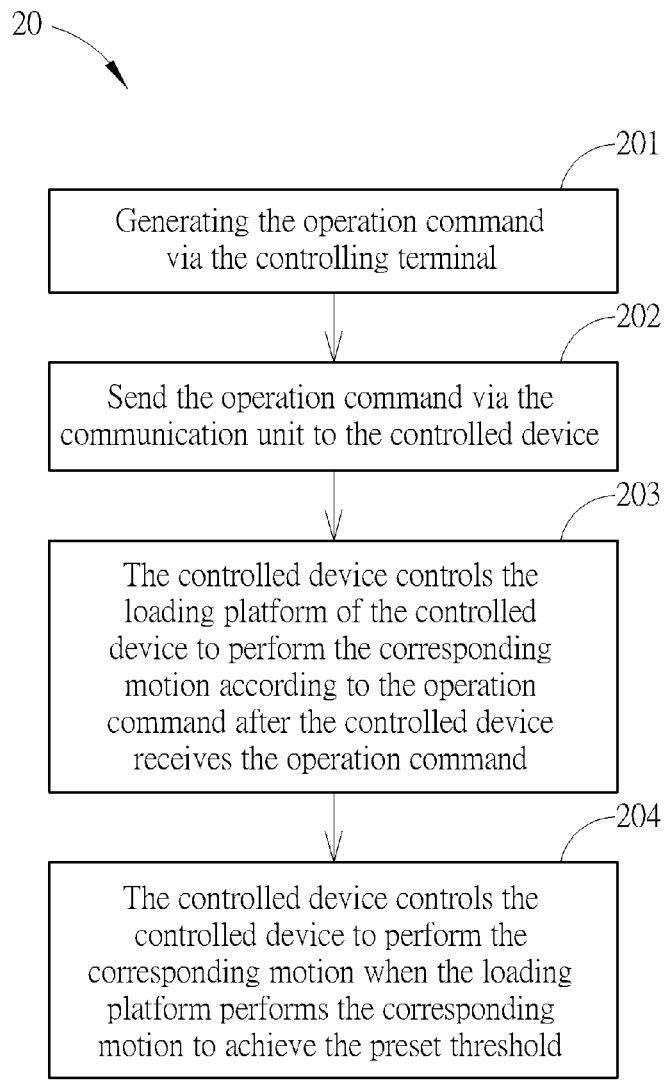
FIG. 20 is a schematic diagram of a process according to an embodiment of the present application.

FIG. 20 is a schematic diagram of a process 20 according to an embodiment of the present application. The process 20 may be executed by the control system of the present application. The process 20 comprises the following steps.

Step 201: Generating the operation command by the controlling terminal.

Step 202: Send the operation command via the communication unit to the controlled device.

Step 203: The controlled device controls the loading platform of the controlled device to perform the corresponding motion according to the operation command after the controlled device receives the operation command.

Step 204: The controlled device controls the controlled device to perform the corresponding motion when the loading platform performs the corresponding motion to achieve the preset threshold.

Figure 21:
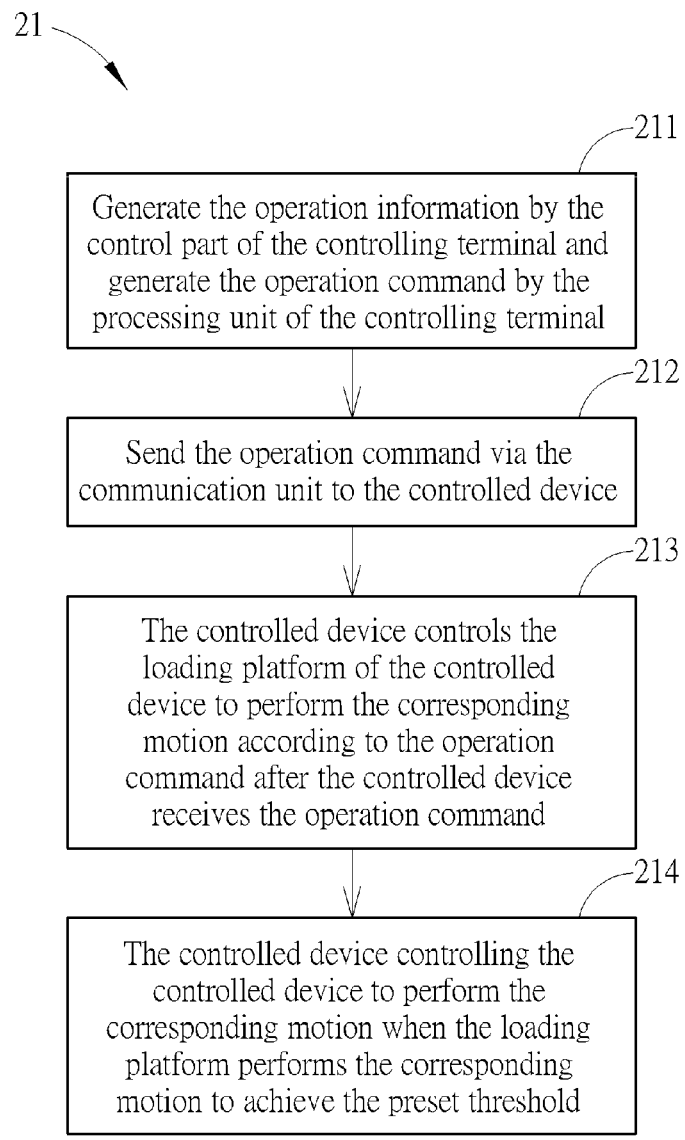
FIG. 21 is a schematic diagram of a process according to an embodiment of the present application.

FIG. 21 is a schematic diagram of a process 21 according to an embodiment of the present application. The process 21 may be executed by the control system of the present application. The process 21 comprises the following steps.

Step 211: Generate the operation information by the control part of the controlling terminal and generate the operation command by the processing unit of the controlling terminal.

Step 212: Send the operation command via the communication unit to the controlled device.

Step 213: The controlled device controls the loading platform of the controlled device to perform the corresponding motion according to the operation command after the controlled device receives the operation command.

Step 214: The controlled device controlling the controlled device to perform the corresponding motion when the loading platform performs the corresponding motion to achieve the preset threshold.

Figure 19:
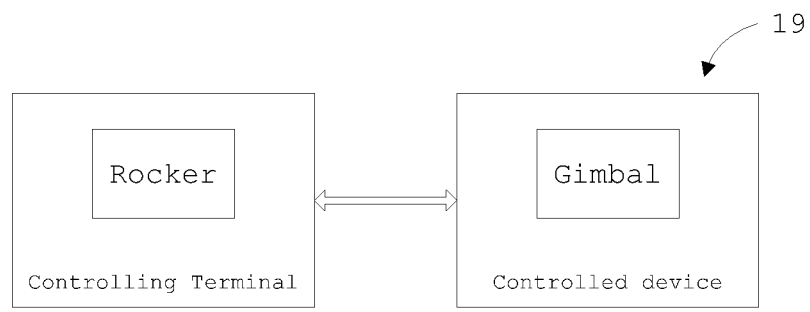
FIG. 19 is a functional block diagram of a control system according to an embodiment of the present application.

In an embodiment, the controlling terminal may be a remote controller; the control part is a rocker. The controlled device may be a drone. The loading platform may be a gimbal. FIG. 19 is a functional block diagram of a control system 19 according to an embodiment of the present application. The control system 19 comprises a controlling terminal and a controlled device. The controlling terminal of the control system 19 may be a remoter controller, which may comprise a rocker or a rocker device. The controlled device of the control system 19 comprises a gimbal, and a camera may be disposed on the gimbal.

In an embodiment, the operation command comprises the operation information brought by the rocker; the drone generates a command for controlling the gimbal of the drone to perform the corresponding motion according to the operation command. In an embodiment, the operation command comprises the command for controlling the gimbal of the drone to perform the corresponding motion according to the operation command.

The corresponding motion may be a gimbal pitch operation, a gimbal yaw operation or a gimbal roll operation. The pitch operation is referred to rotation with respect to a lateral axis. The yaw operation is referred to rotation with respect to a perpendicular axis. The roll operation is referred to rotation with respect to a longitudinal axis.

In an embodiment, when the operation command comprises the command for the gimbal to perform the gimbal pitch operation, or after the drone or the gimbal receives the operation command, the drone controls the gimbal to perform the pitch operation according to a back-and-forth manipulation or a left-and-right manipulation performed by the user onto the rocker.

Figure 22:
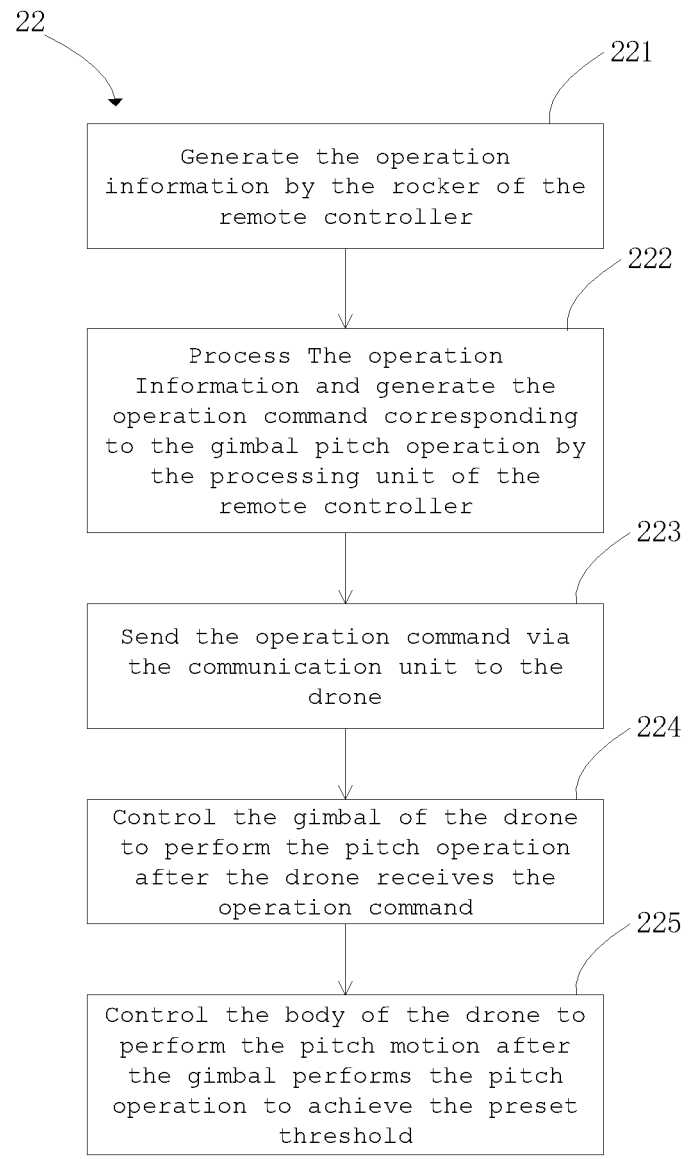
FIG. 22 is a schematic diagram of a process according to an embodiment of the present application.

FIG. 22 is a schematic diagram of a process 22 according to an embodiment of the present application. The process 22 may be executed by the control system of the present application. The process 22 comprises the following steps.

Step 221: Generate the operation information by the rocker of the remote controller.

Step 222: Process the operation information and generate the operation command corresponding to the gimbal pitch operation by the processing unit of the remote controller.

Step 223: Send the operation command via the communication unit to the drone.

Step 224: Control the gimbal of the drone to perform the pitch operation after the drone receives the operation command.

Step 225: Control the body of the drone to perform the pitch motion after the gimbal performs the pitch operation to achieve the preset threshold.

In detail, the preset threshold is a preset angle of the gimbal pitch operation. After the gimbal performs the pitch operation and achieves the preset angle, the drone controls the body of the drone to perform a pitch motion in a direction which is the same as the gimbal pitch operation, such that an actual pitch angle which the gimbal experiences is greater than the preset angle.

In addition, in the process 22, the operation command corresponding to the gimbal pitch operation is generated by the processing unit of the remote controller, but not limited thereto. The operation command corresponding to the gimbal pitch operation may be generated by the drone as well.

Figure 23:
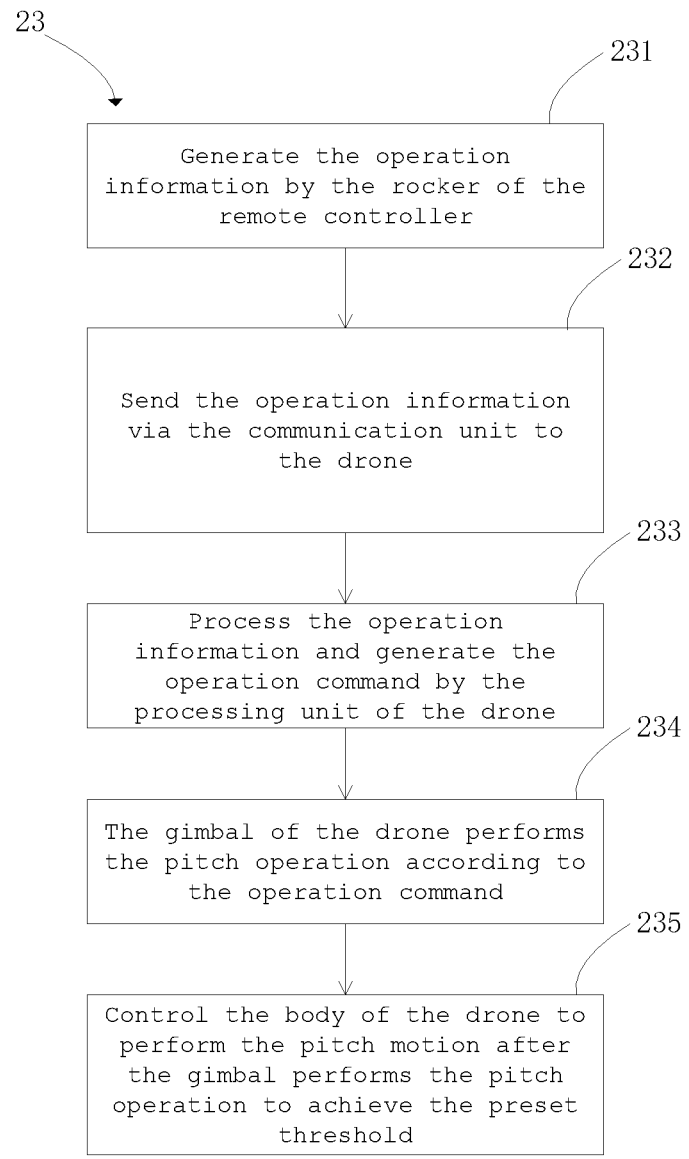
FIG. 23 is a schematic diagram of a process according to an embodiment of the present application.

FIG. 23 is a schematic diagram of a process 23 according to an embodiment of the present application. The process 23 may be executed by the control system of the present application. The process 23 comprises the following steps.

Step 231: Generate the operation information by the rocker of the remote controller.

Step 232: Send the operation information via the communication unit to the drone.

Step 233: Process the operation information and generate the operation command by a processing unit of the drone.

Step 234: The gimbal of the drone performs the pitch operation according to the operation command.

Step 235: Controls the body of the drone to perform the pitch motion after the gimbal performs the pitch operation to achieve the preset threshold.

In addition, in the process 23, the operation command corresponding to the gimbal pitch operation is generated by the processing unit of the drone, which is also within the scope of the present invention.

In an embodiment, when the operation command comprises the command for the gimbal to perform the gimbal yaw operation, or after the drone or the gimbal receives the operation command, the drone controls the gimbal to perform the yaw operation according to the back-and-forth manipulation or the left-and-right manipulation performed by the user onto the rocker.

Figure 24:
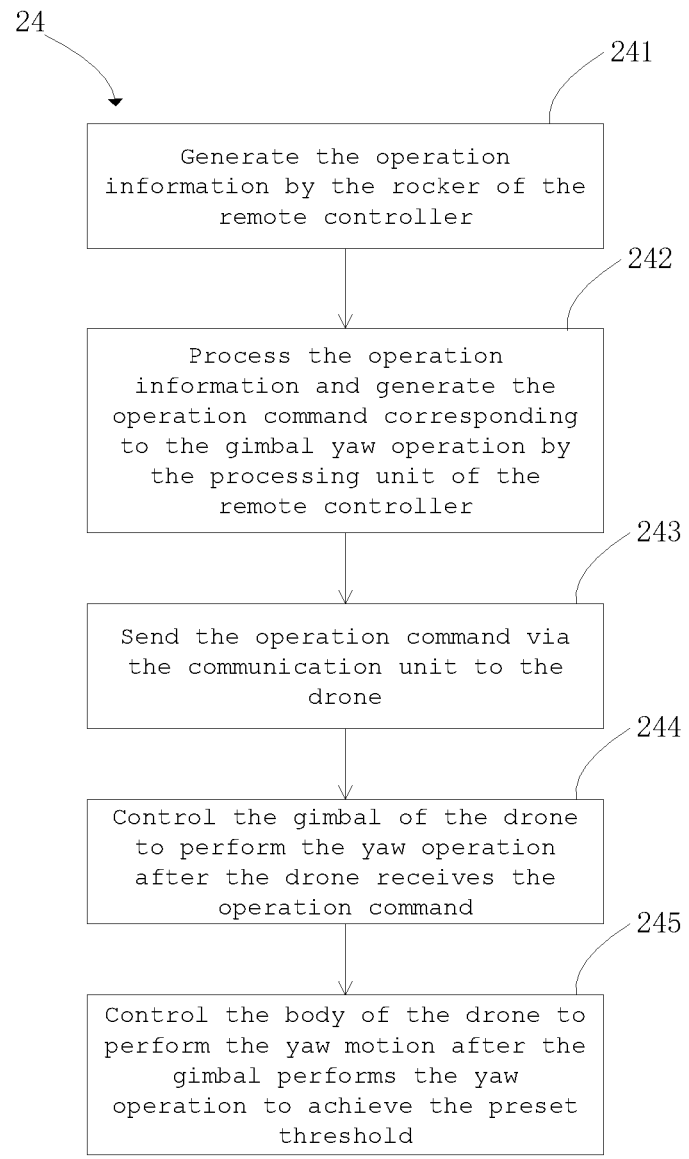
FIG. 24 is a schematic diagram of a process according to an embodiment of the present application.

FIG. 24 is a schematic diagram of a process 24 according to an embodiment of the present application. The process 24 may be executed by the control system of the present application. The process 24 comprises the following steps.

Step 241: Generate the operation information by the rocker of the remote controller.

Step 242: Process the operation information and generate the operation command corresponding to the gimbal yaw operation by the processing unit of the remote controller.

Step 243: Send the operation command via the communication unit to the drone.

Step 244: Control the gimbal of the drone to perform the yaw operation after the drone receives the operation command.

Step 245: Control the body of the drone to perform the yaw motion after the gimbal performs the yaw operation to achieve the preset threshold.

In detail, the preset threshold is a preset angle of the gimbal yaw operation. After the gimbal performs the yaw operation and achieves the preset angle, the drone controls the body of the drone to perform a yaw motion in a direction which is the same as the gimbal yaw operation, such that the gimbal is able to perform yaw operation in 360° without limitation.

In addition, in the process 24, the operation command corresponding to the gimbal yaw operation is generated by the processing unit of the remote controller, but not limited thereto. The operation command corresponding to the gimbal yaw operation may be generated by the drone as well.

Figure 25:
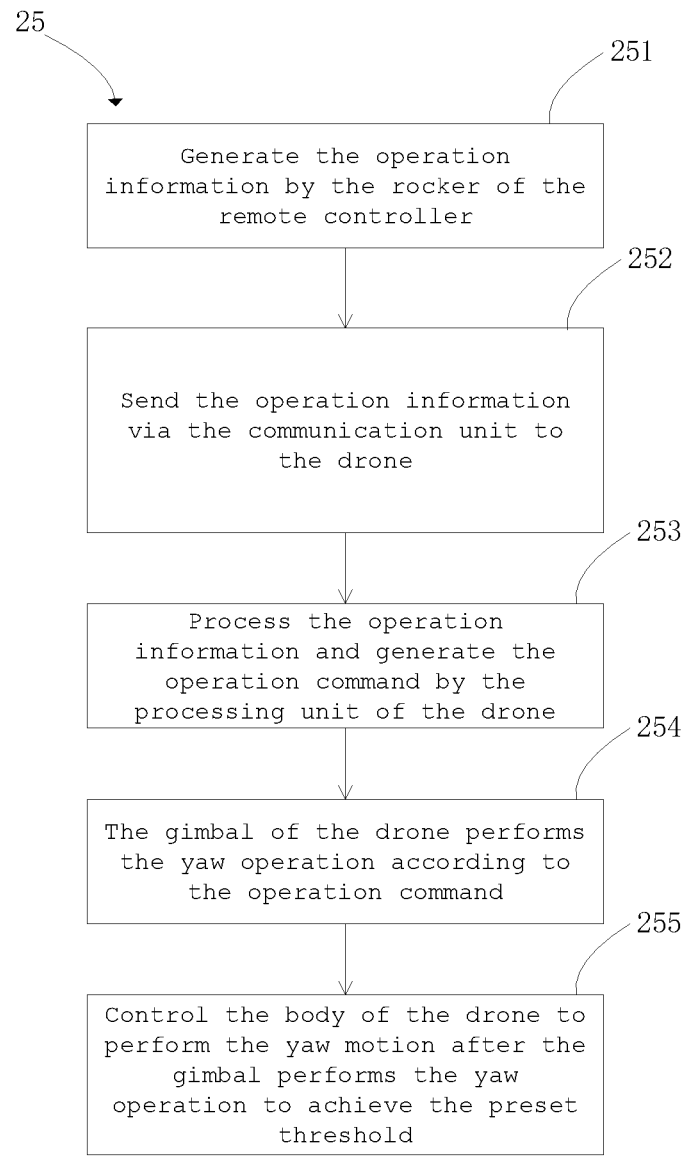
FIG. 25 is a schematic diagram of a process according to an embodiment of the present application.

FIG. 25 is a schematic diagram of a process 25 according to an embodiment of the present application. The process 25 may be executed by the control system of the present application. The process 25 comprises the following steps.

Step 251: Generate the operation information by the rocker of the remote controller.

Step 252: Send the operation information via the communication unit to the drone.

Step 253: Process the operation information and generate the operation command by the processing unit of the drone.

Step 254: The gimbal of the drone performs the yaw operation according to the operation command.

Step 255: Controls the body of the drone to perform the yaw motion after the gimbal performs the yaw operation to achieve the preset threshold.

In addition, in the process 25, the operation command corresponding to the gimbal yaw operation is generated by the processing unit of the drone, which is also within the scope of the present invention.

In an embodiment, when the operation command comprises the command for the gimbal to perform the gimbal roll operation, or after the drone or the gimbal receives the operation command, the drone controls the gimbal to perform the roll operation according to the back-and-forth manipulation or the left-and-right manipulation performed by the user onto the rocker.

Figure 26:
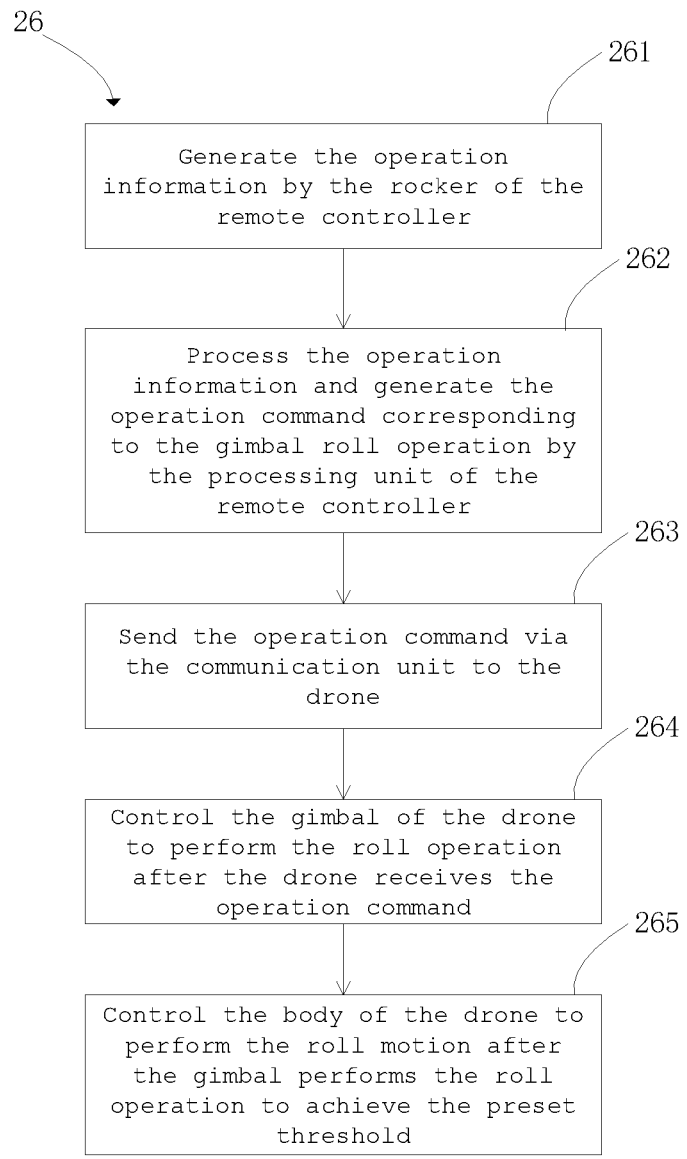
FIG. 26 is a schematic diagram of a process according to an embodiment of the present application.

FIG. 26 is a schematic diagram of a process 26 according to an embodiment of the present application. The process 26 may be executed by the control system of the present application. The process 26 comprises the following steps.

Step 261: Generate the operation information by the rocker of the remote controller.

Step 262: Process the operation information and generate the operation command corresponding to the gimbal roll operation by the processing unit of the remote controller.

Step 263: Send the operation command via the communication unit to the drone.

Step 264: Control the gimbal of the drone to perform the roll operation after the drone receives the operation command.

Step 265: Control the body of the drone to perform the roll motion after the gimbal performs the roll operation to achieve the preset threshold.

In detail, the preset threshold is a preset angle of the gimbal roll operation. After the gimbal performs the roll operation and achieves the preset angle, the drone controls the body of the drone to perform a roll motion in a direction which is the same as the gimbal roll operation, such that an actual roll angle which the gimbal experiences is greater than the preset angle.

In addition, in the process 26, the operation command corresponding to the gimbal roll operation is generated by the processing unit of the remote controller, but not limited thereto. The operation command corresponding to the gimbal roll operation may be generated by the drone as well.

Figure 27:
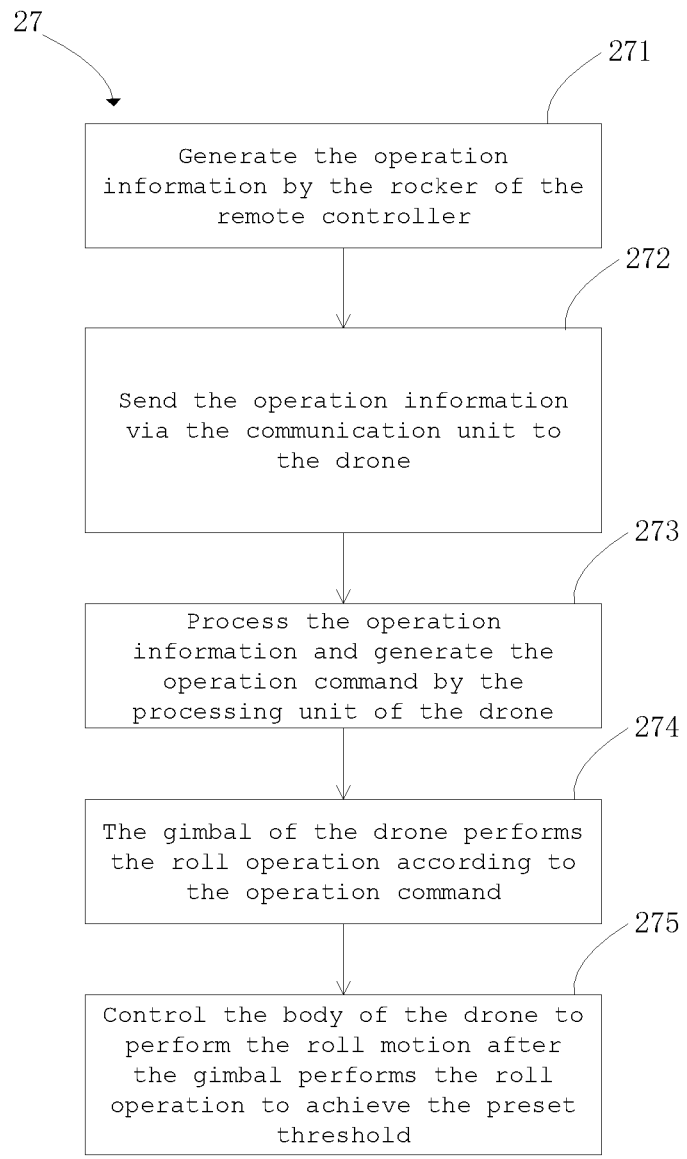
FIG. 27 is a schematic diagram of a process according to an embodiment of the present application.

FIG. 27 is a schematic diagram of a process 27 according to an embodiment of the present application. The process 27 may be executed by the control system of the present application. The process 27 comprises the following steps.

Step 271: Generate the operation information by the rocker of the remote controller.

Step 272: Send the operation information via the communication unit to the drone.

Step 273: Process the operation information and generate the operation command by the processing unit of the drone.

Step 274: The gimbal of the drone performs the pith operation according to the operation command.

Step 275: Controls the body of the drone to perform the pitch motion after the gimbal performs the pitch operation to achieve the preset threshold.

In addition, in the process 27, the operation command corresponding to the gimbal yaw operation is generated by the processing unit of the drone, which is also within the scope of the present invention.

Figure 29:
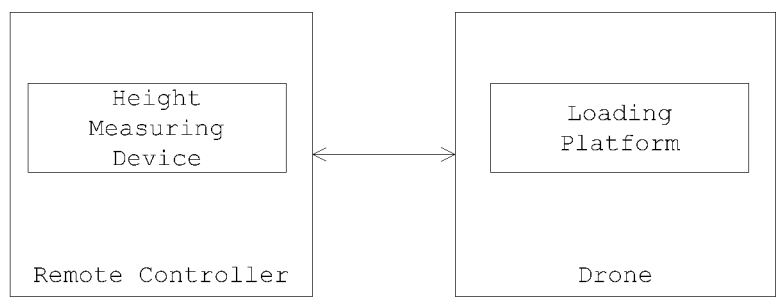
FIG. 29 is a functional block diagram of a control system according to an embodiment of the present application.

In another perspective, the control part of the controlling terminal within the control system 18 may be a height measuring device. FIG. 29 is a functional block diagram of a control system 29 according to an embodiment of the present application. The remote control within the control system 28 comprises a height measuring device. The loading platform of the drone within the control system 29 may be a gimbal.

Figure 30:
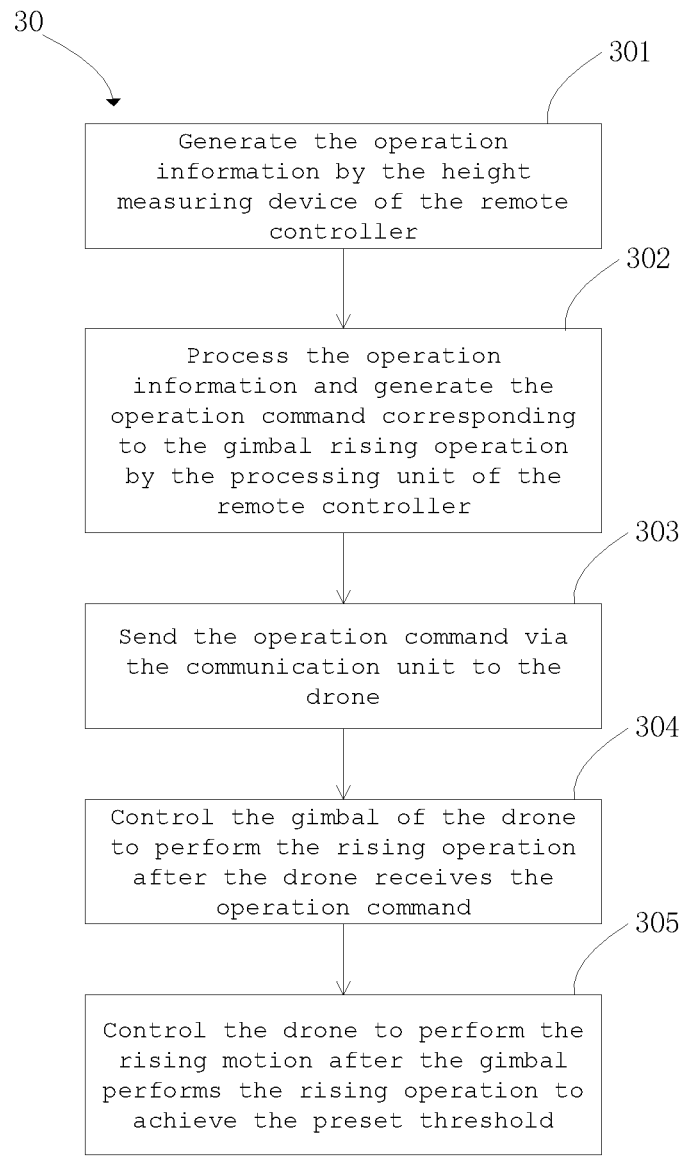
FIG. 30 is a schematic diagram of a process according to an embodiment of the present application.

FIG. 30 is a schematic diagram of a process 30 according to an embodiment of the present application. The process 30 may be executed by the control system of the present application. The process 30 comprises the following steps.

Step 301: Generate the operation information by the height measuring device of the remote controller.

Step 302: Process the operation information and generate the operation command corresponding to the gimbal rising operation by the processing unit of the remote controller.

Step 303: Send the operation command via the communication unit to the drone.

Step 304: Control the gimbal of the drone to perform the rising operation after the drone receives the operation command.

Step 305: Control the drone to perform the rising motion after the gimbal performs the rising operation to achieve the preset threshold.

In addition, the preset threshold is a preset height of the loading platform performing the rising operation. After the loading platform performs the rising operation and achieves the preset height, the drone rises, such that a rising height of the loading platform is greater than the preset height.

In addition, in the process 30, the operation command corresponding to the gimbal rising operation is generated by the processing unit of the remote controller, but not limited thereto. The operation command corresponding to the gimbal rising operation may be generated by the drone as well.

Figure 31:
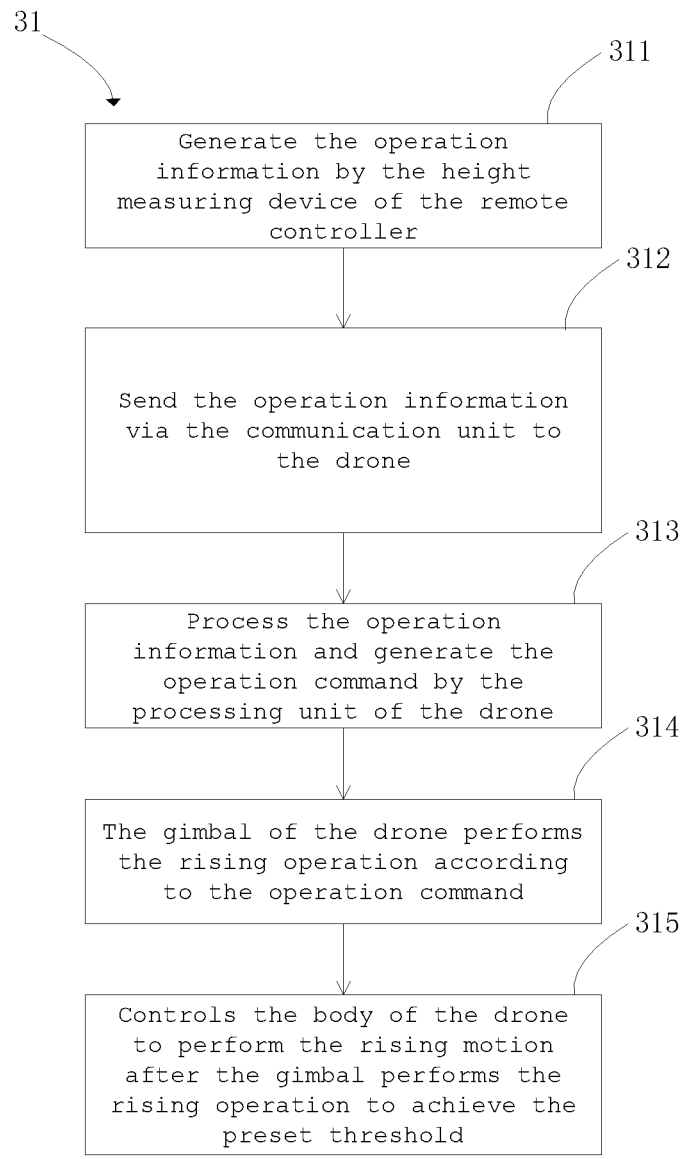
FIG. 31 is a schematic diagram of a process according to an embodiment of the present application.

FIG. 31 is a schematic diagram of a process 31 according to an embodiment of the present application. The process 31 may be executed by the control system of the present application. The process 31 comprises the following steps.

Step 311: Generate the operation information by the height measuring device of the remote controller.

Step 312: Send the operation information via the communication unit to the drone.

Step 313: Process the operation information and generate the operation command by the processing unit of the drone.

Step 314: The gimbal of the drone performs the rising operation according to the operation command.

Step 315: Controls the body of the drone to perform the rising motion after the gimbal performs the rising operation to achieve the preset threshold.

In addition, in the process 31, the operation command corresponding to the gimbal rising operation is generated by the processing unit of the drone, which is also within the scope of the present invention.

Figure 32:
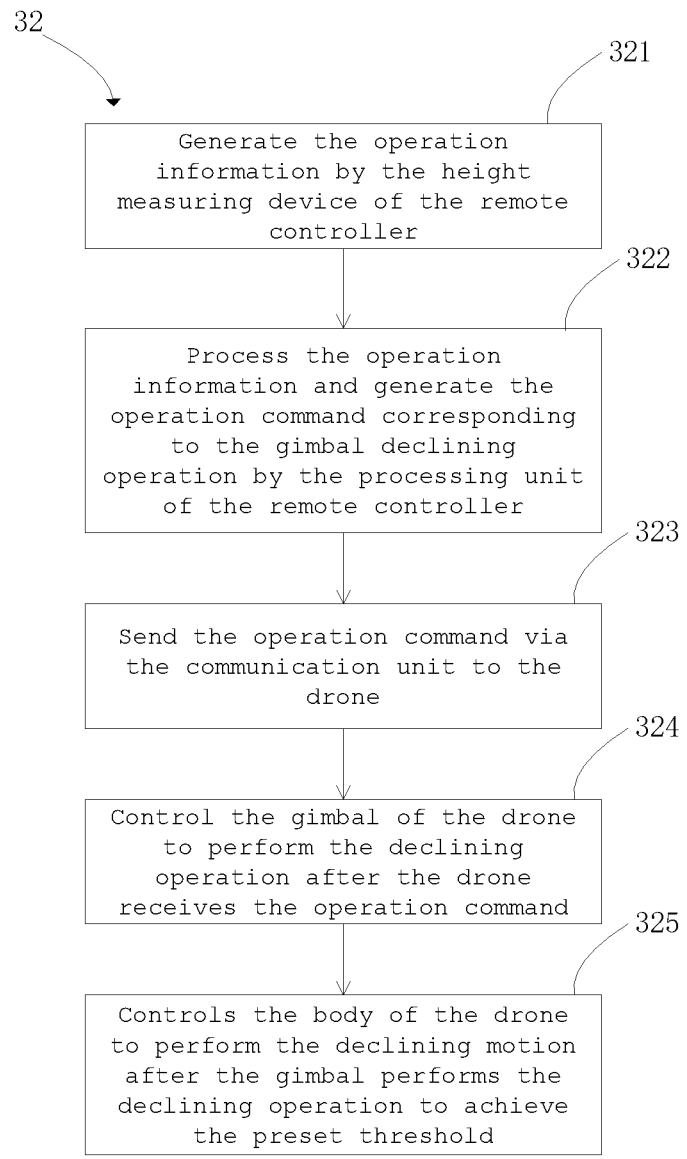
FIG. 32 is a schematic diagram of a process according to an embodiment of the present application.

FIG. 32 is a schematic diagram of a process 32 according to an embodiment of the present application. The process 32 may be executed by the control system of the present application. The process 32 comprises the following steps.

Step 321: Generate the operation information by the height measuring device of the remote controller.

Step 322: Process the operation information and generate the operation command corresponding to the gimbal declining operation by the processing unit of the remote controller.

Step 323: Send the operation command via the communication unit to the drone.

Step 324: Control the gimbal of the drone to perform the declining operation after the drone receives the operation command.

Step 325: Control the drone to perform the declining motion after the gimbal performs the declining operation to achieve the preset threshold.

In addition, the preset threshold is a preset height of the loading platform performing the rising operation. After the loading platform performs the declining operation and achieves the preset height, the drone rises, such that a declining height of the loading platform is greater than the preset height.

In addition, in the process 32, the operation command corresponding to the gimbal declining operation is generated by the processing unit of the remote controller, but not limited thereto. The operation command corresponding to the gimbal declining operation may be generated by the drone as well.

Figure 33:
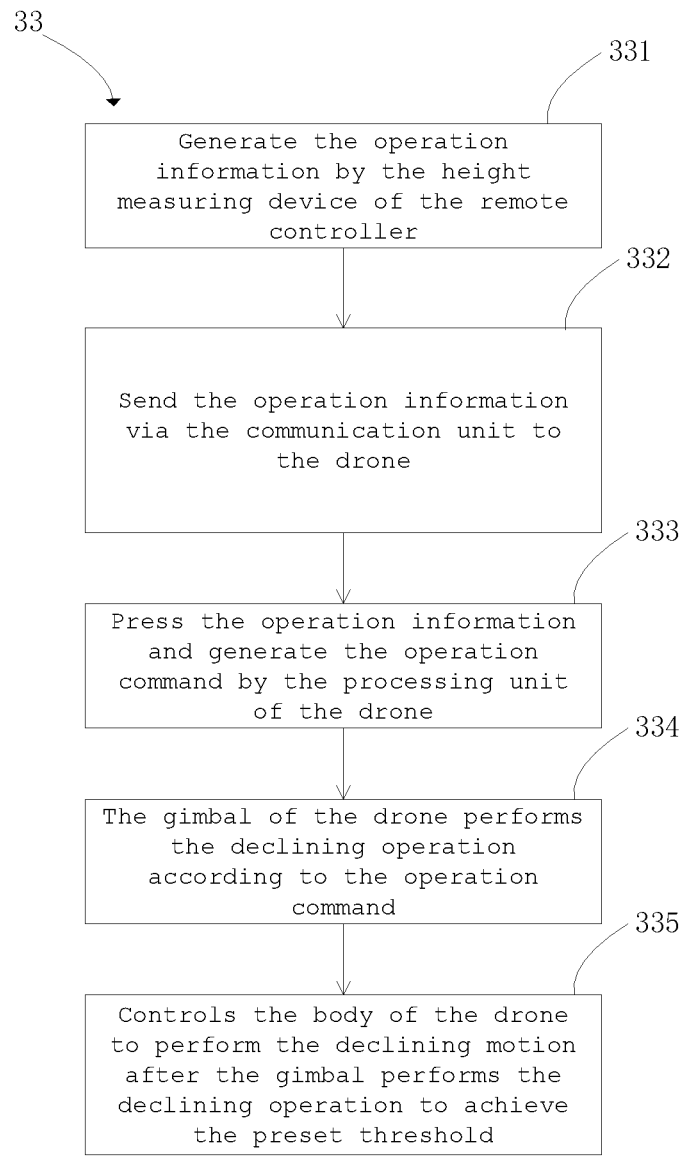
FIG. 33 is a schematic diagram of a process according to an embodiment of the present application.

FIG. 33 is a schematic diagram of a process 33 according to an embodiment of the present application. The process 33 may be executed by the control system of the present application. The process 33 comprises the following steps.

Step 331: Generate the operation information by the height measuring device of the remote controller.

Step 332: Send the operation information via the communication unit to the drone.

Step 333: Process the operation information and generate the operation command by the processing unit of the drone.

Step 334: The gimbal of the drone performs the declining operation according to the operation command.

Step 335: Controls the body of the drone to perform the declining motion after the gimbal performs the declining operation to achieve the preset threshold.

In addition, in the process 33, the operation command corresponding to the gimbal declining operation is generated by the processing unit of the drone, which is also within the scope of the present invention.

Figure 28:
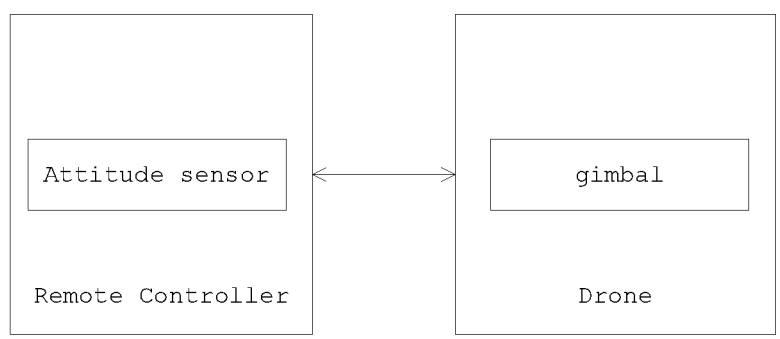
FIG. 28 is a functional block diagram of a control system according to an embodiment of the present application.

In another perspective, the control part of the controlling terminal within the control system 18 may be an attitude sensor. FIG. 28 is a functional block diagram of a control system 28 according to an embodiment of the present application. The remote control within the control system 28 comprises an attitude sensor. Controlling mechanism thereof is similar, which is not narrated herein for brevity.

In another perspective, the drone may operate in a user-perspective mode. In general, the flying direction of the drone may be referred to be with respect to a head direction, which is the direction from the center of the drone to the head of the drone. While in the user-perspective mode, the flying direction of the drone is not with respect to the head direction as in the general mode. Under the user-perspective mode, the flying direction of the drone is with respect to a specific direction besides the head direction. In an embodiment, under the user-perspective mode, the specific direction stated in the above may be a direction from the drone to the remote controller. In another embodiment, under the user-perspective mode, the specific direction stated in the above may be an initial head direction which is a head direction at the time the drone takes off. In short, under the user-perspective mode, the specific direction, which the flying direction of the drone is with respect to, is not limited to be the head direction and may be user-specific.

In an embodiment, the drone automatically switches a flight mode to the user-perspective mode after the remote controller and the drone are successfully connected. In another embodiment, the flight mode of the drone is switched to the user-perspective mode via a mode switching part of the remote controller.

Figure 34:
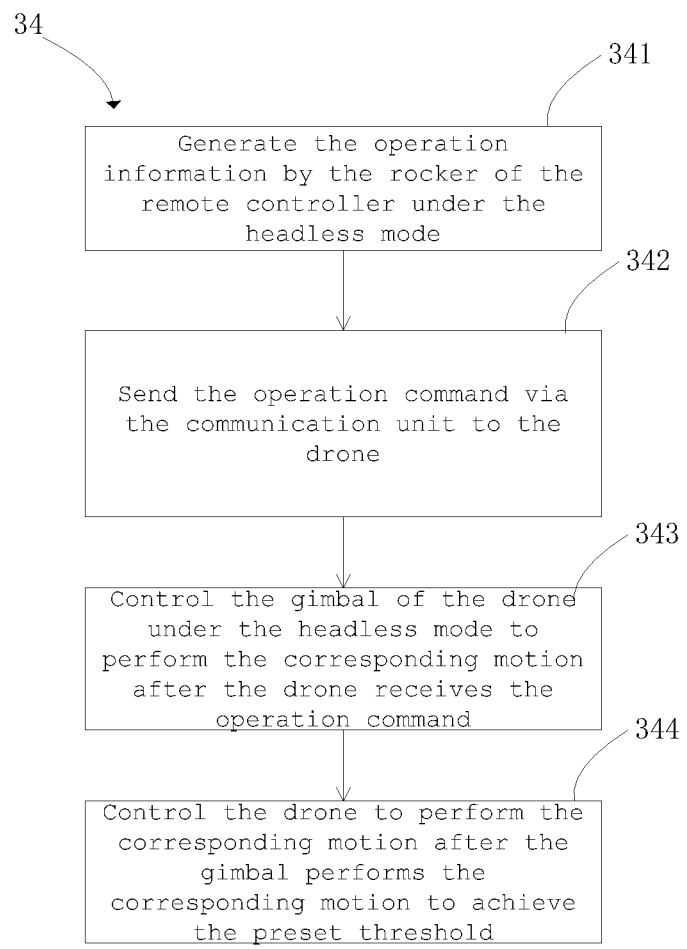
FIG. 34 is a schematic diagram of a process according to an embodiment of the present application.

FIG. 34 is a schematic diagram of a process 34 according to an embodiment of the present application. The process 34 may be executed by the control system of the present application. The process 34 comprises the following steps.

Step 341: Generate the operation information by the rocker of the remote controller under the user-perspective mode.

Step 342: Send the operation command via the communication unit to the drone.

Step 343: Control the gimbal of the drone under the user-perspective mode to perform the corresponding motion after the drone receives the operation command.

Step 344: Control the drone to perform the corresponding motion after the gimbal performs the corresponding motion to achieve the preset threshold.

The process 34 is similar to the process 21. Different from the process 21, the process 34 is executed under the user-perspective mode.

Figure 35:
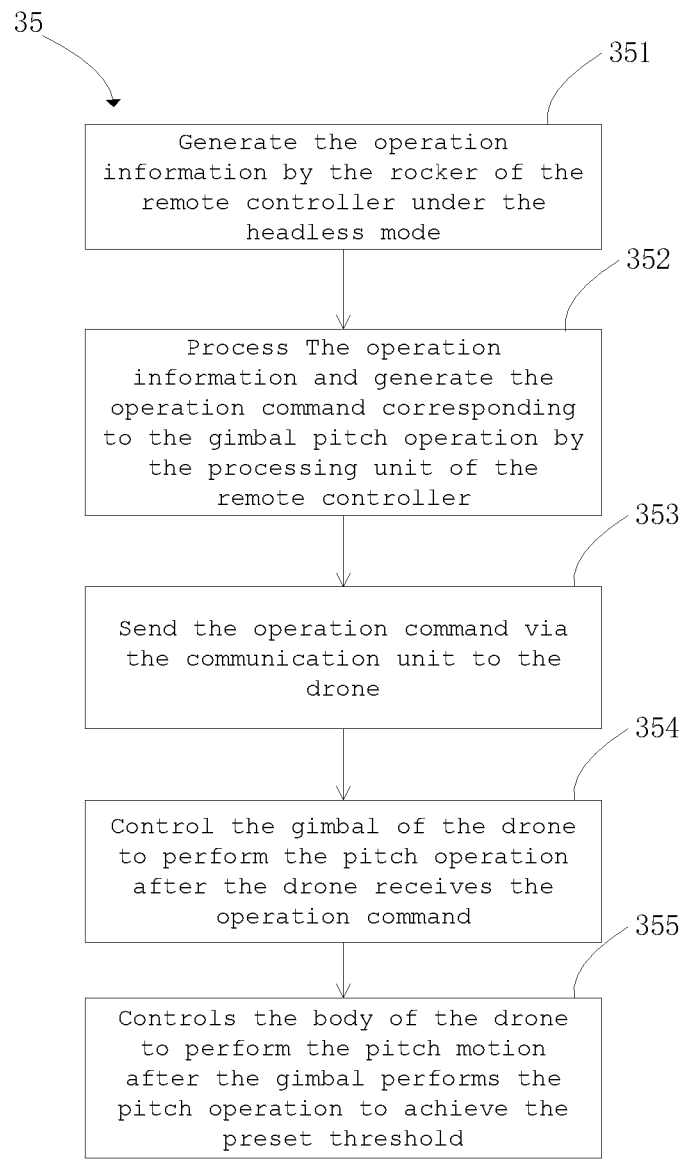
FIG. 35 is a schematic diagram of a process according to an embodiment of the present application.

FIG. 35 is a schematic diagram of a process 35 according to an embodiment of the present application. The process 35 may be executed by the control system of the present application. The process 35 comprises the following steps.

Step 351: Generate the operation information by the rocker of the remote controller under the user-perspective mode.

Step 352: Process the operation information and generate the operation command corresponding to the gimbal pitch operation by the processing unit of the remote controller.

Step 353: Send the operation command via the communication unit to the drone.

Step 354: Control the gimbal of the drone to perform the pitch operation after the drone receives the operation command.

Step 355: Control the body of the drone to perform the pitch motion after the gimbal performs the pitch operation to achieve the preset threshold.

The process 35 is similar to the process 22. Different from the process 22, the process 35 is executed under the user-perspective mode.

Figure 36:
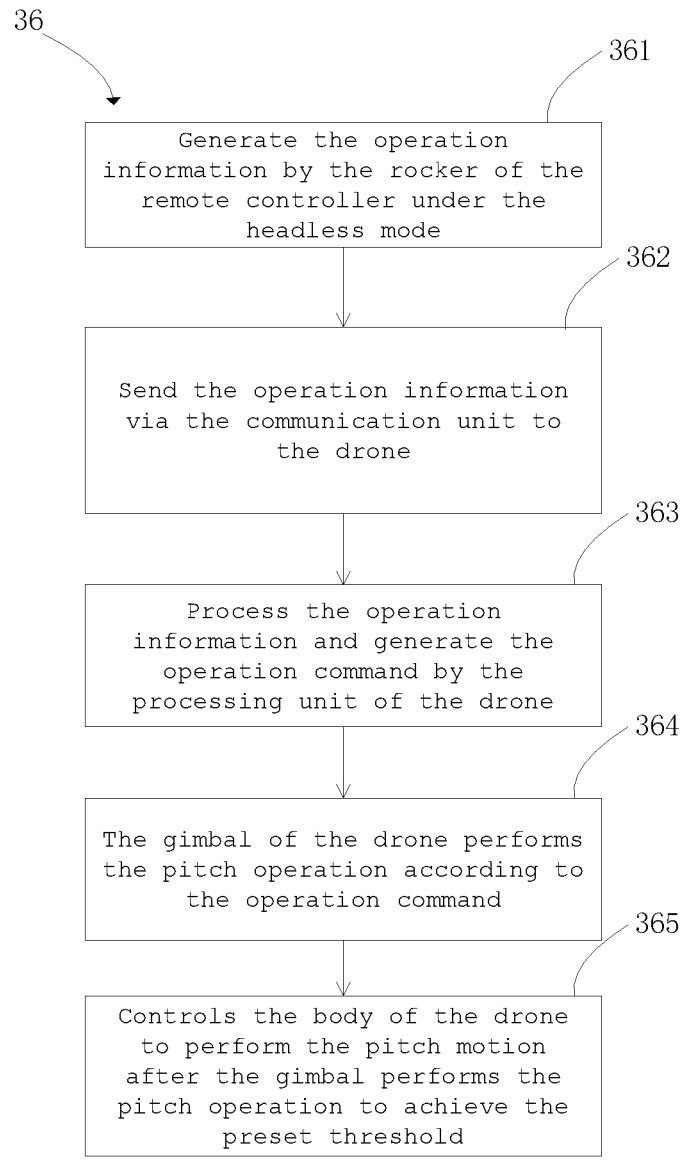
FIG. 36 is a schematic diagram of a process according to an embodiment of the present application.

FIG. 36 is a schematic diagram of a process 36 according to an embodiment of the present application. The process 36 may be executed by the control system of the present application. The process 36 comprises the following steps.

Step 361: Generate the operation information by the rocker of the remote controller under the user-perspective mode.

Step 362: Send the operation information via the communication unit to the drone.

Step 363: Process the operation information and generate the operation command by the processing unit of the drone.

Step 364: The gimbal of the drone performs the pitch operation according to the operation command.

Step 365: Controls the body of the drone to perform the pitch motion after the gimbal performs the pitch operation to achieve the preset threshold.

The process 36 is similar to the process 23. Different from the process 23, the process 36 is executed under the user-perspective mode.

Figure 37:
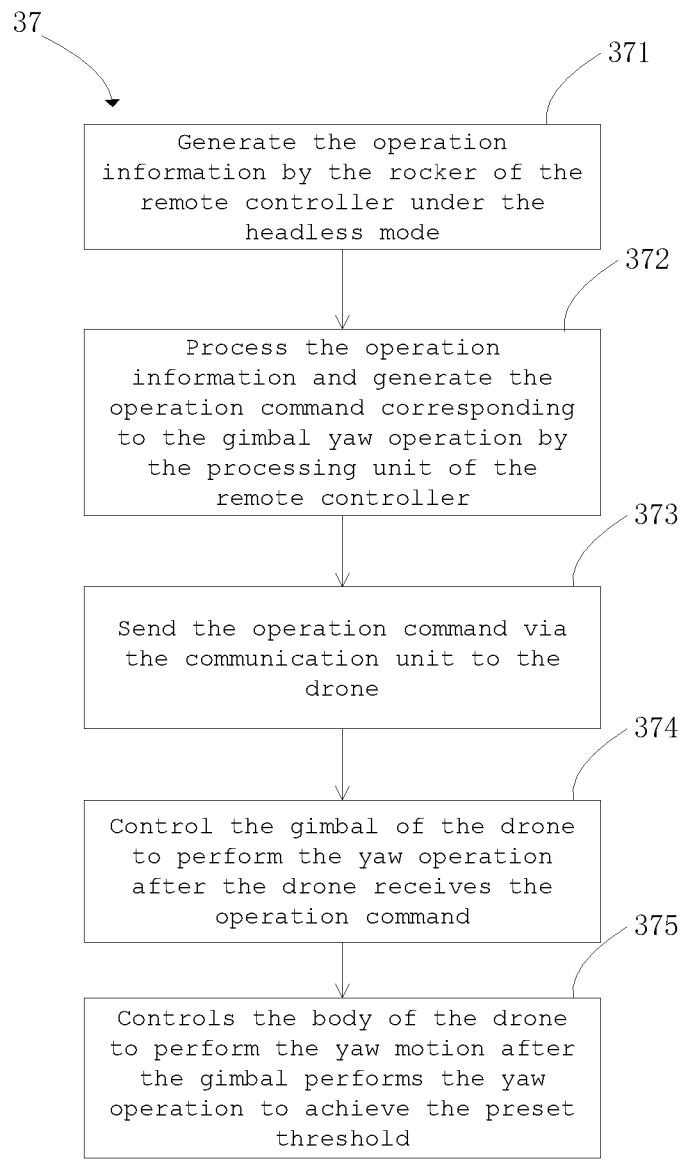
FIG. 37 is a schematic diagram of a process according to an embodiment of the present application.

FIG. 37 is a schematic diagram of a process 37 according to an embodiment of the present application. The process 37 may be executed by the control system of the present application. The process 37 comprises the following steps.

Step 371: Generate the operation information by the rocker of the remote controller under the user-perspective mode Step 372: Process the operation information and generate the operation command corresponding to the gimbal yaw operation by the processing unit of the remote controller.

Step 373: Send the operation command via the communication unit to the drone.

Step 374: Control the gimbal of the drone to perform the yaw operation after the drone receives the operation command.

Step 375: Control the body of the drone to perform the yaw motion after the gimbal performs the yaw operation to achieve the preset threshold The process 37 is similar to the process 24. Different from the process 24, the process 37 is executed under the user-perspective mode.

Figure 38:
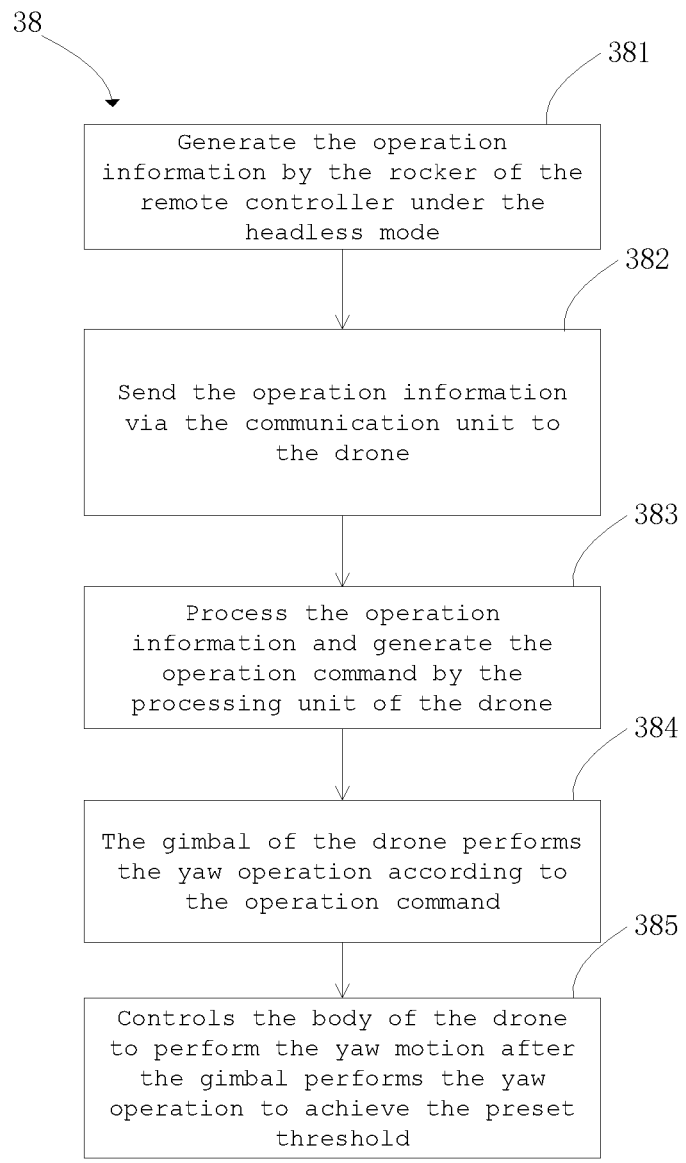
FIG. 38 is a schematic diagram of a process according to an embodiment of the present application.

FIG. 38 is a schematic diagram of a process 38 according to an embodiment of the present application. The process 38 may be executed by the control system of the present application. The process 38 comprises the following steps.

Step 381: Generate the operation information by the rocker of the remote controller under the user-perspective mode.

Step 382: Send the operation information via the communication unit to the drone.

Step 383: Process the operation information and generate the operation command by the processing unit of the drone.

Step 384: The gimbal of the drone performs the yaw operation according to the operation command.

Step 385: Controls the body of the drone to perform the yaw motion after the gimbal performs the yaw operation to achieve the preset threshold.

The process 38 is similar to the process 25. Different from the process 25, the process 38 is executed under the user-perspective mode.

Figure 39:
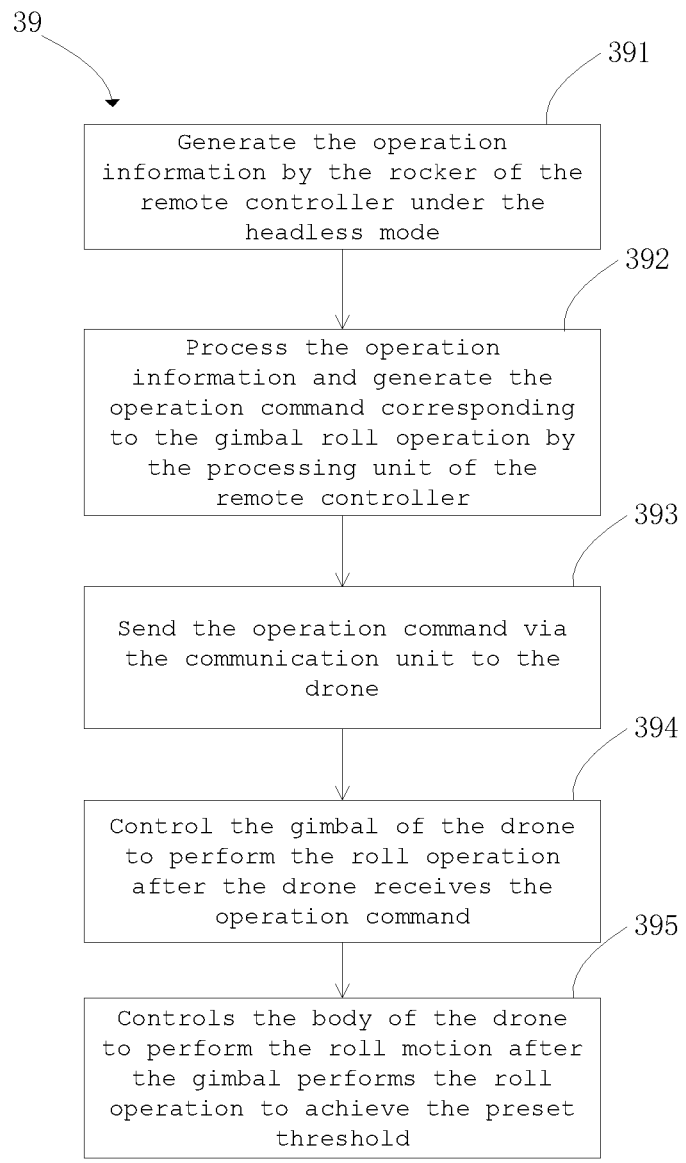
FIG. 39 is a schematic diagram of a process according to an embodiment of the present application.

FIG. 39 is a schematic diagram of a process 39 according to an embodiment of the present application. The process 39 may be executed by the control system of the present application. The process 39 comprises the following steps.

Step 391: Generate the operation information by the rocker of the remote controller under the user-perspective mode.

Step 392: Process the operation information and generate the operation command corresponding to the gimbal roll operation by the processing unit of the remote controller.

Step 393: Send the operation command via the communication unit to the drone.

Step 394: Control the gimbal of the drone to perform the roll operation after the drone receives the operation command.

Step 395: Control the body of the drone to perform the roll motion after the gimbal performs the roll operation to achieve the preset threshold.

The process 39 is similar to the process 26. Different from the process 26, the process 39 is executed under the user-perspective mode.

Figure 40:
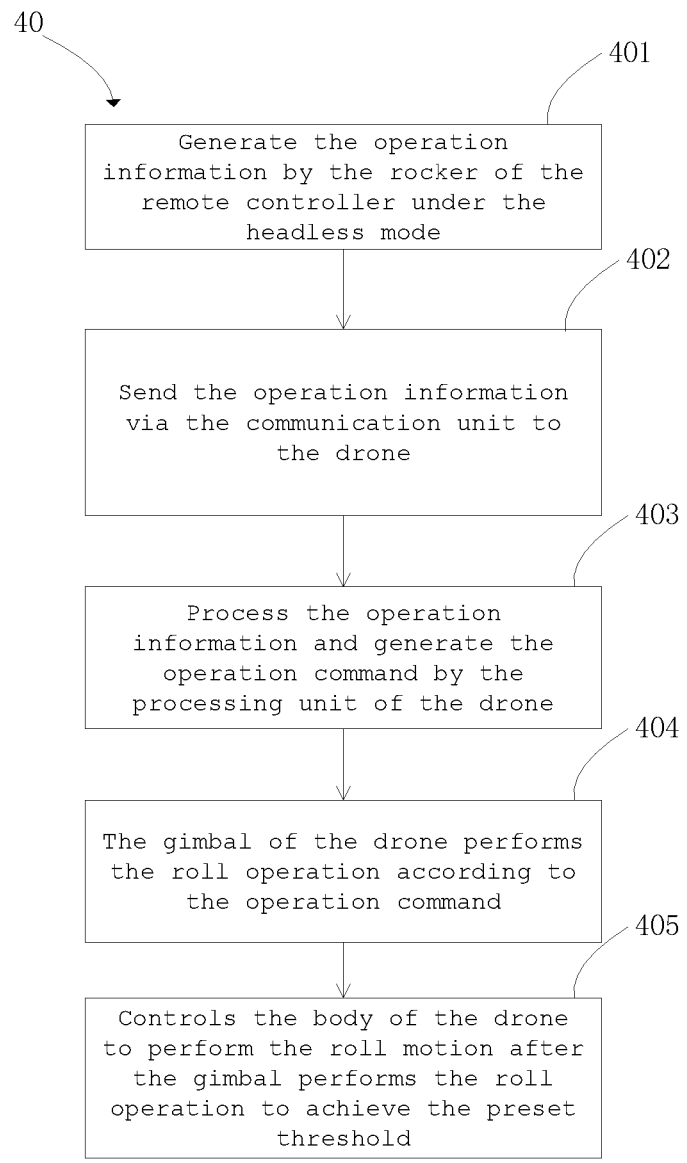
FIG. 40 is a schematic diagram of a process according to an embodiment of the present application.

FIG. 40 is a schematic diagram of a process 40 according to an embodiment of the present application. The process 40 may be executed by the control system of the present application. The process 40 comprises the following steps.

Step 401: Generate the operation information by the rocker of the remote controller under the user-perspective mode.

Step 402: Send the operation information via the communication unit to the drone.

Step 403: Process the operation information and generate the operation command by the processing unit of the drone.

Step 404: The gimbal of the drone performs the roll operation according to the operation command.

Step 405: Controls the body of the drone to perform the roll motion after the gimbal performs the roll operation to achieve the preset threshold.

The process 40 is similar to the process 27. Different from the process 27, the process 40 is executed under the user-perspective mode.

The foregoing is to illustrate embodiments of the present application, which is not intended to limit the present application. Any modification following the spirit and principle of the present application, equivalent substitutions, improvements should be included within the scope of the present application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control system, the control system comprises a controlling terminal and a controlled device;
   the controlling terminal comprises a height measuring device and a processing unit;
   the height measuring device is configured to measure and obtain a height information of the controlling terminal, and send the height information to the processing unit;
   the processing unit is configured to receive the height information and generate an operation command;
   the controlled device is configured to receive the operation command and perform a corresponding motion according to the operation command the controlling terminal is a remote controller, the remote controller is a primary remote controller, wherein the primary remote controller does not have motion-sensing functionality;
   the controlled device is a drone;
   the height measuring device determines that the primary remote controller is rising, the operation command comprises a rising information, and the drone increases a flight altitude of the drone according to the operation command after the drone receives the operation command;

the height measuring device determines that the primary remote controller is declining, the operation command comprises a declining information, the drone decreases the flight altitude of the drone according to the operation command after the drone receives the operation command.

2. The control system as claim 1, the controlling terminal comprises a communication unit;
the communication unit is connected to the processing unit and configured to perform data transmission with the controlled device; and
the communication unit comprises one or any combination of a WiFi module, a Bluetooth module or an infrared ray emission module.

3. The control system as claim 1, the corresponding motion comprises varying a height of the controlled device;
the controlled device receiving the operation command and performing the corresponding motion according to the operation command comprises that the controlled device adjusts the height of the controlled device according to the height information of the controlling terminal measured by the height measuring device.

4. The control system as claim 1, the remote controller is a somatosensory remote controller;
when the height measuring device determines that the somatosensory remote controller is rising, the operation command comprises a rising information, and the drone increases a flight altitude of the drone according to the operation command after the drone receives the operation command;
when the height measuring device determines that the somatosensory remote controller is declining, the operation command comprises a declining information, the drone decreases the flight altitude of the drone according to the operation command after the drone receives the operation command.

5. The control system as claim 4, the somatosensory remote controller comprises an attitude sensor configured to detect and generate an attitude information; and
the processing unit is configured to generate the operation command according to the attitude information and send the operation command to the drone.

6. The control system as claim 4, the somatosensory remote controller further comprises a power switch and a remote control activation switch;
the power switch is configured to cutoff the power supply or to open the power supply;
the remote control activation switch is connected to the processing unit;
when the remote control activation switch is on, the somatosensory remote controller takes a current location as an initial location to control the drone; and when the remote control activation switch is off, the somatosensory remote controller stops operation.

7. The control system as claim 1, the primary remote controller further comprises a rocker and a power supply;
the rocker is configured to generate a rocker information and send the rocker information to the processing unit;
the processing unit is configured to form the operation command according to the rocker information generated by the rocker and send the operation command to the drone; and
the power supply is configured to supply power to the primary remote controller.

8. The control system as claim 4, the somatosensory remote controller further comprises a sensing device;
the sensing device comprises one or any combination of a pressure sensor, a fingerprint sensor or a temperature sensor;
the pressure sensor is configured to obtain a pressure information perceived by the somatosensory remote controller, and send the pressure information to the processing unit so as to form the operation command;
the fingerprint sensor is configured to obtain a fingerprint information of the user, and send the fingerprint information to the processing unit so as to form the operation command; and
the temperature sensor is configured to obtain a temperature information of an environment in which the somatosensory remote controller stays, and send the temperature information to the processing unit so as to form the operation command.

9. A control method, the control method comprises:
generating an operation command via a controlling terminal;
sending the operation command via a communication unit to a controlled device;
the controlled device controlling a loading platform of the controlled device to perform a corresponding motion according to the operation command after the controlled device receives the operation command;
the controlled device controlling the controlled device to perform the corresponding motion when the loading platform performs the corresponding motion to achieve a preset threshold;
the controlling terminal is a remote controller; the remoted controller comprises a height measuring device; the controlled device is a drone; the corresponding motion is a rising or a declining of the loading platform;
the operation command comprises an operation information brought by the height measuring device; the drone generates a command for controlling the loading platform of the drone to perform the corresponding motion according to the operation command; or
the operation command comprises a command for controlling the loading platform of the drone to perform the corresponding motion according to the operation command.

10. The control method as claim 9, the loading platform is a gimbal; the corresponding motion is a gimbal pitch operation, a gimbal yaw operation or a gimbal roll operation.

11. The control method as claim 10, the drone generates a command for controlling the gimbal of the drone to perform the corresponding motion according to the operation command; or
the operation command comprises the command for controlling the gimbal of the drone to perform the corresponding motion according to the operation command.

12. The control method as claim 10, characterized in that, when the operation command comprises the command for the gimbal to perform the gimbal pitch operation, the drone or the gimbal receives the operation command to control the gimbal to perform a pitch operation; after the gimbal performs the pitch operation and achieves a preset angle, the droned controls a body of the drone to perform a pitch motion in a direction which is the same as the gimbal pitch operation, such that an actual pitch angel which the gimbal experiences is greater than the preset angle; or
when the operation command comprises the command for the gimbal to perform the gimbal yaw operation, the drone or the gimbal receives the operation command to control the gimbal to perform a yaw operation; after the gimbal performs the yaw operation and achieves a preset angle, the drone controls a body of the drone to perform a yaw operation in a direction which is the same as the gimbal yaw operation, such that an actual yaw angle which the gimbal experiences is greater than the preset angle; or when the operation command comprises the command for the gimbal to perform the gimbal roll operation, the drone or the gimbal receives the operation command to control the gimbal to perform a roll operation; after the gimbal performs the roll operation and achieves a preset angle, the drone controls a body of the drone to perform a roll operation in a direction which is the same as the gimbal roll operation, such that an actual roll angle which the gimbal experiences is greater than the preset angle.

13. The control method as claim 10, the remote controller further comprises an attitude sensor, and the control part is the attitude sensor;

the attitude sensor is configured to obtain an attitude information of a main body of the remote controller, and send the attitude information to a processing unit of the remote controller so as to form the operation command to control the gimbal.

14. The control method 9, when the operation command comprises the command for the loading platform to perform the rising operation, the drone or the loading platform receives the operation command to control the loading platform to perform the rising operation according to a rising value of the remote controller measured by the height measuring device; after the loading platform perform the rising operation and achieves a preset height, the drone rises, such that a rising height of the loading platform is greater than the preset height; or when the operation command comprises the command for the loading platform to perform the declining operation, the drone or the loading platform receives the operation command to control the loading platform to perform the declining operation according to a declining value of the remote controller measured by the height measuring device; after the loading platform perform the declining operation and achieves a preset height, the drone declines, such that a declining height of the loading platform is greater than the preset height.

15. The control method as claim 9, the loading platform is gimbal; the drone controlling the gimbal to perform the corresponding motion according to the operation command under a headless mode; and the drone controlling the drone to perform the corresponding motion when the gimbal performs the corresponding motion to achieve a preset threshold.

16. The drone control method as claim 9, after the remote controller and the drone are successfully connected, the drone automatically switches a flight mode to a headless mode; or the flight mode of the drone is switched to the headless mode via a mode switching part of the remote controller.

* * * * *